(12) United States Patent
Brewer

(10) Patent No.: US 8,423,745 B1
(45) Date of Patent: Apr. 16, 2013

(54) SYSTEMS AND METHODS FOR MAPPING A NEIGHBORHOOD OF DATA TO GENERAL REGISTERS OF A PROCESSING ELEMENT

(75) Inventor: Tony Brewer, Plano, TX (US)

(73) Assignee: Convey Computer, Richardson, TX (US)

( * ) Notice: Subject to any disclaimer, the term of this patent is extended or adjusted under 35 U.S.C. 154(b) by 616 days.

(21) Appl. No.: 12/619,441

(22) Filed: Nov. 16, 2009

(51) Int. Cl.
*G06F 12/00* (2006.01)

(52) U.S. Cl.
USPC .......................................... 711/172; 711/173

(58) Field of Classification Search .................. None
See application file for complete search history.

(56) References Cited

U.S. PATENT DOCUMENTS

| | | |
|---|---|---|
| 3,434,114 A | 3/1969 | Arulpragasam et al. |
| 4,128,880 A | 12/1978 | Cray, Jr. |
| 4,386,399 A | 5/1983 | Rasala et al. |
| 4,685,076 A | 8/1987 | Yoshida |
| 4,817,140 A | 3/1989 | Chandra et al. |
| 4,897,783 A | 1/1990 | Nay |
| 5,027,272 A | 6/1991 | Samuels |
| 5,109,499 A | 4/1992 | Inagami et al. |
| 5,117,487 A * | 5/1992 | Nagata ........................... 712/211 |
| 5,154,419 A | 10/1992 | Madhavan |
| 5,202,969 A | 4/1993 | Sato et al. |
| 5,222,224 A | 6/1993 | Flynn et al. |
| 5,283,886 A | 2/1994 | Nishii et al. |
| 5,430,887 A | 7/1995 | Hsiao |
| 5,513,366 A | 4/1996 | Agarwal et al. |
| 5,598,546 A | 1/1997 | Blomgren |
| 5,664,136 A | 9/1997 | Witt et al. |
| 5,675,823 A | 10/1997 | Hsiao |
| 5,752,035 A | 5/1998 | Trimberger |
| 5,838,984 A | 11/1998 | Nguyen et al. |
| 5,887,182 A | 3/1999 | Kinoshita |
| 5,887,183 A | 3/1999 | Agarwal et al. |
| 5,920,721 A | 7/1999 | Hunter et al. |
| 5,935,204 A | 8/1999 | Shimizu et al. |
| 5,937,192 A | 8/1999 | Martin |
| 5,941,938 A | 8/1999 | Thayer |
| 5,999,734 A | 12/1999 | Willis et al. |

(Continued)

FOREIGN PATENT DOCUMENTS

WO    WO-2008/014494    1/2008

OTHER PUBLICATIONS

Belgard, Rich, "Reconfigurable Illogic", Microprocessor, The Insiders Guide to Microprocessor Hardware, May 10, 2004, 4 pgs.

(Continued)

*Primary Examiner* — Shawn X Gu
(74) *Attorney, Agent, or Firm* — Fulbright & Jaworski L.L.P.

(57) ABSTRACT

The present invention is directed to systems and methods for mapping a neighborhood of data to general registers of a processing element. Embodiments of the present invention provide techniques for mapping a neighborhood of data to general registers that are "neighborhood constrained" because the general register set is of insufficient size in one or more dimensions to fully store a desired neighborhood of data in a manner that maintains the positional arrangement of such data. However, a window access method is employed for mapping the neighborhood of data to the general register set, thereby enabling the neighborhood of data to be stored to the general register set in a manner that maintains the positional arrangement of such data as may be desired for performing nearest-neighbor types of operations by the processing element.

34 Claims, 6 Drawing Sheets

U.S. PATENT DOCUMENTS

| | | | |
|---|---|---|---|
| 6,006,319 | A | 12/1999 | Takahashi et al. |
| 6,023,755 | A | 2/2000 | Casselman |
| 6,047,287 | A | 4/2000 | Caruana |
| 6,075,546 | A | 6/2000 | Hussain et al. |
| 6,076,139 | A | 6/2000 | Welker et al. |
| 6,076,152 | A | 6/2000 | Huppenthal et al. |
| 6,097,402 | A | 8/2000 | Case et al. |
| 6,125,421 | A | 9/2000 | Roy |
| 6,170,001 | B1 | 1/2001 | Hinds et al. |
| 6,175,915 | B1 | 1/2001 | Cashman et al. |
| 6,195,676 | B1 | 2/2001 | Spix et al. |
| 6,202,133 | B1 | 3/2001 | Jeddeloh |
| 6,209,067 | B1 | 3/2001 | Collins et al. |
| 6,240,508 | B1 | 5/2001 | Brown, III et al. |
| 6,342,892 | B1 | 1/2002 | Van Hook et al. |
| 6,434,687 | B1 | 8/2002 | Huppenthal |
| 6,473,831 | B1 | 10/2002 | Schade |
| 6,480,952 | B2 | 11/2002 | Gorishek, IV et al. |
| 6,606,584 | B1 | 8/2003 | Junkins |
| 6,611,908 | B2 | 8/2003 | Lentz et al. |
| 6,665,790 | B1 | 12/2003 | Glossner, III et al. |
| 6,684,305 | B1 | 1/2004 | Deneau |
| 6,701,424 | B1 | 3/2004 | Liao et al. |
| 6,738,967 | B1 | 5/2004 | Radigan |
| 6,789,167 | B2 | 9/2004 | Naffziger |
| 6,831,979 | B2 | 12/2004 | Callum |
| 6,839,828 | B2 | 1/2005 | Gschwind et al. |
| 6,868,472 | B1 | 3/2005 | Miyake et al. |
| 6,891,543 | B2 | 5/2005 | Wyatt |
| 6,954,845 | B2 | 10/2005 | Arnold et al. |
| 6,983,456 | B2 | 1/2006 | Poznanovic et al. |
| 7,000,211 | B2 | 2/2006 | Arnold |
| 7,065,631 | B2 * | 6/2006 | Weaver .................. 712/217 |
| 7,120,755 | B2 | 10/2006 | Jamil et al. |
| 7,149,867 | B2 | 12/2006 | Poznanovic et al. |
| 7,167,971 | B2 | 1/2007 | Asaad et al. |
| 7,225,324 | B2 | 5/2007 | Huppenthal et al. |
| 7,257,757 | B2 | 8/2007 | Chun et al. |
| 7,278,122 | B2 | 10/2007 | Willis |
| 7,315,636 | B2 | 1/2008 | Kuduvalli |
| 7,328,195 | B2 | 2/2008 | Willis |
| 7,367,021 | B2 | 4/2008 | Ansari et al. |
| 7,376,812 | B1 | 5/2008 | Sanghavi et al. |
| 7,421,565 | B1 | 9/2008 | Kohn |
| 7,546,441 | B1 | 6/2009 | Ansari et al. |
| 7,577,822 | B2 | 8/2009 | Vorbach |
| 7,643,353 | B1 | 1/2010 | Srinivasan et al. |
| 2001/0011342 | A1 | 8/2001 | Pechanek et al. |
| 2001/0049816 | A1 | 12/2001 | Rupp |
| 2002/0046324 | A1 | 4/2002 | Barroso et al. |
| 2002/0164067 | A1 | 11/2002 | Askey et al. |
| 2003/0005424 | A1 | 1/2003 | Ansari et al. |
| 2003/0140222 | A1 | 7/2003 | Ohmi et al. |
| 2003/0226018 | A1 | 12/2003 | Tardo et al. |
| 2004/0003170 | A1 | 1/2004 | Gibson et al. |
| 2004/0107331 | A1 | 6/2004 | Baxter |
| 2004/0117599 | A1 | 6/2004 | Mittal et al. |
| 2004/0193837 | A1 | 9/2004 | Devaney et al. |
| 2004/0193852 | A1 | 9/2004 | Johnson |
| 2004/0194048 | A1 | 9/2004 | Arnold |
| 2004/0215898 | A1 | 10/2004 | Arimilli et al. |
| 2004/0221127 | A1 | 11/2004 | Ang |
| 2004/0236920 | A1 | 11/2004 | Sheaffer |
| 2004/0243984 | A1 | 12/2004 | Vorbach et al. |
| 2004/0250046 | A1 | 12/2004 | Gonzalez et al. |
| 2005/0027970 | A1 | 2/2005 | Arnold et al. |
| 2005/0044539 | A1 | 2/2005 | Liebenow |
| 2005/0108503 | A1 | 5/2005 | Sandon et al. |
| 2005/0172099 | A1 | 8/2005 | Lowe |
| 2005/0188368 | A1 | 8/2005 | Kinney |
| 2005/0223369 | A1 | 10/2005 | Chun et al. |
| 2005/0262278 | A1 | 11/2005 | Schmidt |
| 2006/0075060 | A1 | 4/2006 | Clark |
| 2006/0149941 | A1 | 7/2006 | Colavin et al. |
| 2006/0259737 | A1 | 11/2006 | Sachs et al. |
| 2006/0288191 | A1 | 12/2006 | Asaad et al. |
| 2007/0005881 | A1 | 1/2007 | Garney |
| 2007/0005932 | A1 | 1/2007 | Covelli et al. |
| 2007/0038843 | A1 | 2/2007 | Trivedi et al. |
| 2007/0106833 | A1 | 5/2007 | Rankin et al. |
| 2007/0130445 | A1 | 6/2007 | Lau et al. |
| 2007/0153907 | A1 | 7/2007 | Mehta et al. |
| 2007/0157166 | A1 | 7/2007 | Stevens |
| 2007/0186210 | A1 | 8/2007 | Hussain et al. |
| 2007/0226424 | A1 | 9/2007 | Clark et al. |
| 2007/0245097 | A1 | 10/2007 | Gschwind et al. |
| 2007/0283336 | A1 | 12/2007 | Gschwind et al. |
| 2007/0288701 | A1 | 12/2007 | Hofstee et al. |
| 2007/0294666 | A1 | 12/2007 | Papakipos et al. |
| 2008/0059758 | A1 | 3/2008 | Sachs |
| 2008/0059759 | A1 | 3/2008 | Sachs |
| 2008/0059760 | A1 | 3/2008 | Sachs |
| 2008/0104365 | A1 | 5/2008 | Kohno et al. |
| 2008/0209127 | A1 | 8/2008 | Brokenshire et al. |
| 2008/0215854 | A1 | 9/2008 | Asaad et al. |
| 2009/0132501 | A1 | 5/2009 | Bae et al. |
| 2009/0172364 | A1 | 7/2009 | Sprangle et al. |
| 2010/0002572 | A1 | 1/2010 | Garrett |
| 2010/0138587 | A1 | 6/2010 | Hutson |
| 2011/0055516 | A1 | 3/2011 | Willis |

OTHER PUBLICATIONS

Trednnick, Nick et al., "Microprocessor Sunset", Microprocessor, The Insiders Guide to Microprocessor Hardware, May 3, 2004, 4 pgs.

U.S. Appl. No. 11/841,406, Wallach et al.

U.S. Appl. No. 11/847,169, Wallach et al.

International Search Report and Written Opinion issued for PCT/US08/74566 dated Nov. 14, 2008, 9 pgs.

International Search Report and Written Opinion issued for PCT/US08/75828 dated Nov. 18, 2008, 12 pgs.

International Search Report and Written Opinion issued for PCT/US08/73423 dated Nov. 12, 2008, 12 pgs.

Arnold, Jeffrey M., "The Splash 2 Processor and Applications", 1993 IEEE, pp. 482-485.

Express Corporation, "XSA Board V1.1, V1.2 User Manual" (Release Date: Jun. 23, 2005).

Express, "XSA-50 Spartan-2 Prototyping Board with 2.5V, 50,000-gate FPGA" (copyright 1998-2008).

International Search Report and Written Opinion issued for PCT/US08/87233, dated Feb. 5, 2009, 11 pgs.

Weyrich et al., "Post-Processing of Scanned 3D Surface Data", Eurographics Symposium on Point-Based Graphics, 2004, 10 pgs.

A. Gee et al., "Processing and Visualizing Three-Dimensional Ultrasound Data", The British Journal of Radiology, Special Issue 2004, S186-S193, 8 pgs.

The PC Guide, "The PCX's x86 Instruction Set", 2004, www.pcguide.com/ref/cup.arch/int/instX86-c.html, 3 pgs.

Andreas Koch et al., "A Universal Co-Processor for Workstations", 1994, Abingdon EE&CS Books, 14 pgs.

Author unknown, Internet Brief, "Second International Workshop on High-Performance Reconfigurable Computing Technology and Applications (HPRCTA '08)", http://ncsa.illinois.edu/Conferences/HPRCTA08/, dated Nov. 17, 2008., 2 pgs.

Steve Wallach, "Processor Architecture: Past, Present, Future", Power Point Presentation Slides, Presented at "Second International Workshop on High-Performance Reconfigurable Computing Technology and Applications (HPRCTA '08)", dated Nov. 2008, 36 pgs.

Daniel Stevenson et al., "Architecture of a Vertically Stacked Reconfigurable Computer", Power Point Presentation Slides, Presented at "Second International Workshop on High-Performance Reconfigurable Computing Technology and Applications (HPRCTA '08)", dated Nov. 2008, 13 pgs.

Kentaro Sano et al., "Scalable FPGA-Array for High-Performance and Power-Efficient Computation Based on Difference Schemes", Power Point Presentation Slides, Presented at "Second International Workshop on High-Performance Reconfigurable Computing Technology and Applications (HPRCTA '08)", dated Nov. 2008, 11 pgs.

Dave Strenski et al., "Evaluating FPGAs for Floating Point Performance", Power Point Presentation Slides, Presented at "Second International Workshop on High-Performance Reconfigurable Computing Technology and Applications (HPRCTA '08)", dated Nov. 2008, 19 pgs.

Miaoqing Huang et al., "Hardware Task Scheduling Optimizations for Reconfigurable Computing", Power Point Presentation Slides, Presented at "Second International Workshop on High-Performance Reconfigurable Computing Technology and Applications (HPRCTA '08)", dated Nov. 2008, 24 pgs.

Manuel Saldana et al., "MPI as an Abstraction for Software-Hardware Interaction in High Performance Reconfigurable Computers", Power Point Presentation Slides, Presented at "Second International Workshop on High-Performance Reconfigurable Computing Technology and Applications (HPRCTA '08)", dated Nov. 2008, 23 pgs.

Esam El-Araby et al., "Virtualizing and Sharing Reconfigurable Resources in High-Performance Reconfigurable Computing Systems", Power Point Presentation Slides, Presented at "Second International Workshop on High-Performance Reconfigurable Computing Technology and Applications (HPRCTA '08)", dated Nov. 2008, 26 pgs.

Tom Vancourt, Ph.D., "Altera in Reconfigurable Computing: What's New, What's Coming", Power Point Presentation Slides, Presented at "Second International Workshop on High-Performance Reconfigurable Computing Technology and Applications (HPRCTA '08)", dated Nov. 2008, 5 pgs.

Jon Huppenthal, "Current SRC Status", Power Point Presentation Slides, Presented at "Second International Workshop on High-Performance Reconfigurable Computing Technology and Applications (HPRCTA '08)", dated Nov. 2008, 14 pgs.

Matthias Fouquet-Lapar, "Current SGI Status", Power Point Presentation Slides, Presented at "Second International Workshop on High-Performance Reconfigurable Computing Technology and Applications (HPRCTA '08)", dated Nov. 2008, 12 pgs.

Allan Cantle, "FPGA Accelerated Computing Solutions", Power Point Presentation Slides, Presented at "Second International Workshop on High-Performance Reconfigurable Computing Technology and Applications (HPRCTA '08)", dated Nov. 2008, 9 pgs.

Geno Valente, "Current XtremeData Status", Power Point Presentation Slides, Presented at "Second International Workshop on High-Performance Reconfigurable Computing Technology and Applications (HPRCTA '08)", dated Nov. 2008, 16 pgs.

Roy Graham, "Current DRC Computer Status", Power Point Presentation Slides, Presented at "Second International Workshop on High-Performance Reconfigurable Computing Technology and Applications (HPRCTA '08)", dated Nov. 2008, 11 pgs.

Stefan Mohl, "The Future for Accelerators: Mitrionics HPRCTA Update", Power Point Presentation Slides, Presented at "Second International Workshop on High-Performance Reconfigurable Computing Technology and Applications (HPRCTA '08)", dated Nov. 2008, 13 pgs.

David Pellerin, "Impulse Software-to-FPGA Technology Update", Power Point Presentation Slides, Presented at "Second International Workshop on High-Performance Reconfigurable Computing Technology and Applications (HPRCTA '08)", dated Nov. 2008, 6 pgs.

David Caliga, "S/W Technology Update SC08: SRC's Carte Directions", Power Point Presentation Slides, Presented at "Second International Workshop on High-Performance Reconfigurable Computing Technology and Applications (HPRCTA '08)", dated Nov. 2008, 10 pgs.

Siewiorek, Daniel P.; Bell, Gordon C.; Newell, Allen; "Computer Structures: Principles and Examples" McGraw-Hill, 1982, p. 334, Figure 1(a).

Cray XD1™ FPGA Development, Release 1.2; S-6400-12, issued Apr. 18, 2005. Available at www.eng.uah.edu/~jacksoa/CrayXD1FPGADevelopment.pdf.

Callahan, Timothy J.; Hauser, John R.; Wawrzynek, John; "The Garp Architecture and C Compiler", IEEE Computer, vol. 33, No. 4, pp. 62-69, Apr. 2000.

Poster entitled GigaScale Mixed-Signal System Verification, FTL Systems, Inc. presented at the DARPA/MTO Team/NeoCAD2003 Fall Review, Sep. 15-17, 2003, Monterey, CA, a public unclassified meeting.

Poster entitled StarStream™ GigaScale Mixed-Signal System Verification, FTL Systems, Inc. presented at the DARPA/MTO Team/NeoCAD Program Review, Feb. 23, 2004, Scottsdale, AZ, Monterey, CA, a public unclassified meeting.

StarStream Design Summary; FTL Systems, Inc., available at Design Automation Conference (DAC), Jun. 2005, Anaheim, CA.

Gokhale, Maya; "Heterogeneous Processing", Los Alamos Computer Science Institute LACSI 2006, Oct. 17-19, 2006, Santa Fe, NM. Available at www.cct.Isu.edu/~estrabd/LACSI2006/workshops/workshop5/gokhale_mccormick.pdf.

L.N. Bhuyan, "Lecture 15: Symmetric Multiprocessor: Cache Protocols", Feb. 28, 2001, 16 pgs.

Levine et al., Efficient Application Representation for HASTE: Hybrid Architectures with a Single, Transformable Executable', 2003, 10 pgs.

International Search Report and Written Opinion issued for PCT/US09/60811, dated Dec. 1, 2009, 7 pgs.

International Search Report and Written Opinion issued for PCT/US09/60820, dated Dec. 9, 2009, 8 pgs.

Vassiliadis et al., "The ARISE Reconfigurable Instruction Set Extension Framework", Jul. 16, 2007.

Gerald Estrin, "Organization of Computer Systems—The Fixed Plus Variable Structure Computer", 1960.

Hauck, S. "The Roles of FPGAs in Reprogrammable Systems", Proceedings of the IEEE, vol. 86, No. 4, 615-638, Apr. 1998.

Shirazi et al., "Run-Time Management of Dynamically Reconfigurable Designs", Field-Programmable Logic and Applications from FPGAs to Computing Paradigm, 1998.

Page, I., "Reconfigurable Processor Architectures", Microprocessors and Microsystems, vol. 20, Issue 3 May 1996, pp. 185-196.

Callahan et al., "The GARP Architecture and C Compiler", Computer, vol. 33, No. 4. pp. 62-69, Apr. 2000.

* cited by examiner

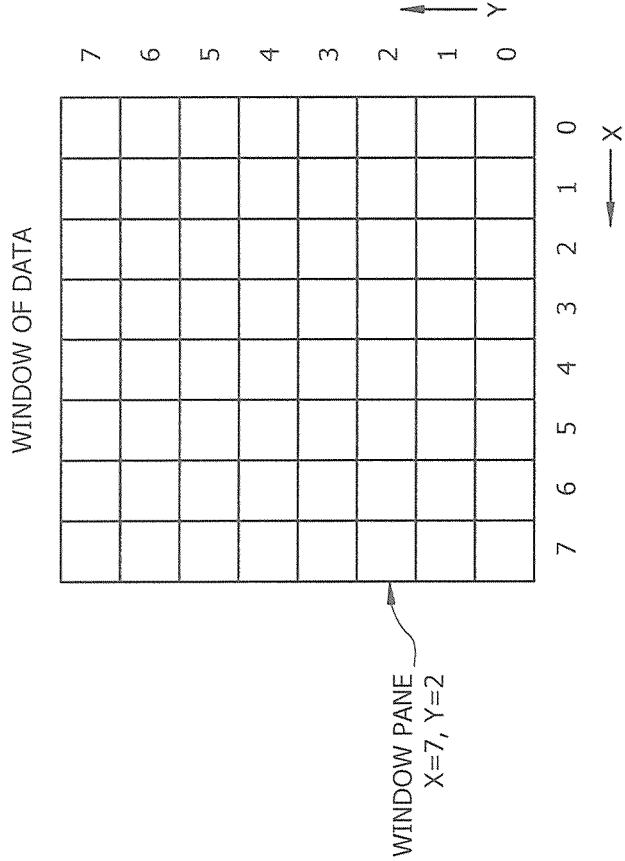

SYSTEMS AND METHODS FOR MAPPING A NEIGHBORHOOD OF DATA TO GENERAL REGISTERS OF A PROCESSING ELEMENT

CROSS-REFERENCE TO RELATED APPLICATIONS

N/A.

TECHNICAL FIELD

The following description relates generally to computer processing and more specifically to systems and methods for mapping a neighborhood of data to general registers of a processing element.

BACKGROUND

Computer processing elements (or "processors," such as central processing units (CPUs), graphics processing units (GPUs), host processors, co-processors, etc.) typically include a processor register file, referred to herein as general registers. A processing element generally includes a set of general registers that are each capable of storing some data value (e.g., each general register may be capable of storing a 32-bit data element). General registers are where data values are held while theprocessing element is performing computation using those data values. Thus, for instance, operands used in performing computations, as well as the results of such computations are typically stored in general registers of a processing element while the processing element is performing such computations. An instruction set executing on the processing element typically expressly manages the processing element's general register set (e.g., expressly manages the movement of data into and out of the general registers).

Certain processing elements may further include additional local data storage, such as a cache. As is well-known in the art, a processing element's cache is a data storage mechanism used by the processing element to reduce the average time to access main memory. The cache is typically a smaller, faster memory (than main memory) which stores copies of the data from the most frequently used main memory locations. As long as most memory accesses are cached memory locations, the average latency of memory accesses will be closer to the cache latency than to the latency of main memory. Typically, when a processing element that has a cache needs to read from or write to a location in main memory, it first checks whether a copy of that data is in its cache. If so, the processing element immediately reads from or writes to the cache, which is typically much faster than reading from or writing to main memory.

The cache is often associatively assigned to the main memory, and it is typically managed automatically by the hardware implemented in the system. So, an application or software process typically does not know expressly when data is coming into the cache or being ejected from the cache, but instead the cache operation is generally implemented by the hardware to be transparent in the path to main memory. Thus, unlike its express management of the general register, an instruction set executing on the processing element typically does not expressly manage the processing element's cache.

One type of data that is desirable to process in many applications is three-dimensional ("3D") data structures. In general, 3D data structures contain data representing a 3D object. For example, in many applications, computer modeling of a 3D object is performed to enable analysis and/or computations concerning the 3D object that may be dangerous, costly, difficult, and/or impossible to perform on the physical 3D object itself. For instance, 3D computer modeling is used in many medical imaging applications, seismic exploration applications, flight simulator applications, and many other types of applications. As one example, two-dimensional ("2D") image data acquired for at least a portion of a patient's body, such as through X-ray, sonogram, computed tomography (CT), etc., may be processed in known ways to generate 3D data structures, which may then be used to perform 3D computer modeling of the imaged portion of the patient's body. For instance, the 3D data structures may be used in certain applications to display a 3D image of the portion of the patient's body. As another example, seismic data may be acquired for a portion of the earth, and the data may be processed in known ways to generate 3D data structures representing the earth as a 3D object. The 3D data structures may then be used by applications to aid in the search for and evaluation of subterranean hydrocarbon and/or other mineral deposits.

Irrespective of how the 3D data structures are generated (e.g., whether through computed tomography, processing of seismic signals, etc.), what physical object(s) the 3D data represents (e.g., whether representing portion(s) of a human body, the earth, or other physical object), or what an application desires to use the data for (e.g., whether aiding in the treatment of a patient, searching for subterranean mineral deposits, flight training, entertainment, etc.), processing of such 3D data structures by processing elements is often complex. Typically, a desire for a processing element to process 3D data structures dictates certain characteristics/requirements in the design of the processing element in order for the processing element to be suitable for efficiently processing the 3D data structures.

One consideration for a processing element that is to process 3D data structures concerns the amount of local storage on the processing element, and particularly the size of the processing element's general register set. Further, as discussed below, not only is the full storage size of the general register set an important consideration, but often the size of one or more dimensions of the general register set is important for maintaining a desired data arrangement. For instance, as is well known in the art, for many types of compute operations on 3D data, the data is effectively organized into neighborhoods and use of some number of "nearest neighbors" are often relied upon for many computational operations. Thus, for instance, when performing certain processing operations on a 3D data structure, a neighborhood type of processing is often employed which may require using k nearest neighbor points, which are those data points closest to (or neighboring) the data point being computed.

Such neighborhood type of processing implicitly relies upon the relative positional arrangement of data. Thus, typically 3D data comprises data points that are arranged in main memory relative to each other, and such relative arrangement is important to maintain for many neighborhood-based computations. Further, it is generally desirable to maintain the relative positional arrangement of the data points within a processing element's general register set for performance of nearest-neighbor type of computational operations.

For example, suppose that a nearest-neighbor computational operation desires to use the 7 nearest neighbors on either side of a data point that is being computed, and further suppose that a general register set provides an 8×8 grid of general registers for storing data points. In this example, the total 64 data points that can be stored in the 8×8 grid would be sufficient for storing the total 15 data points that would be needed in the computation (i.e., the 7 points to the left, the 7 points to the right, and the center point under evaluation), but the data points would have to be "wrapped" around the 8×8 grid in some way and thus the relative positional arrangement of the data points in the neighborhood would not be maintained. Accordingly, at least one dimension of the general register set in this example is of insufficient size for storing the neighborhood of data in a manner that maintains the relative positional arrangement of data points within the neighborhood. That is, because the 8×8 grid does not have enough "X" dimension to allow for the desired 15 points, the relative positional arrangement of the data would not be maintained within the general register set in this example.

As such, traditional processing element designs have attempted to implement a general register set with dimensions of sufficient size to fully store a neighborhood of data that is likely to be required for performing certain operations when processing 3D data, wherein the dimensions of the general register set are of sufficient size to maintain the relative positional arrangement of the data within the neighborhood.

BRIEF SUMMARY

The present invention is directed to systems and methods for mapping a neighborhood of data to general registers of a processing element. More particularly, embodiments of the present invention provide techniques for mapping a neighborhood of data to general registers that are "neighborhood constrained," as discussed further herein. In other words, the general register set of a processing element may be of insufficient size in one or more dimensions to fully store a desired neighborhood of data in a manner that maintains the positional arrangement of such data. However, certain embodiments of the present invention provide a window access method for mapping the neighborhood of data to the general register set, thereby enabling the neighborhood of data to be stored to the general register set in a manner that maintains the positional arrangement of such data as may be desired for performing nearest-neighbor types of operations by the processing element.

As is well known in the art, for many types of compute operations on 3D data, the data is effectively organized into neighborhoods and use of some number of "nearest neighbors" are often relied upon for processing. Thus, when processing 3D data, the data is often organized into a neighborhood of data (e.g., a neighborhood of data elements representing adjacent or "neighboring" portions of the 3D structure that the data represents) for processing, such as for performing certain computational operations. For instance, in performing many operations, some "k" number of nearest neighbors of a given data element are used for performing some computation involving the given data element. Thus, when performing certain processing operations on a 3D grid structure, a neighborhood type of processing is employed which may require using k nearest neighbor points, which are those data points closest to (or neighboring) the data point trying to be solved. In certain operations, the value of k may encompass seven or more neighbor points on each side of the center point value being computed, for example. The full data desired for performing such nearest neighbor operations, e.g., the data point (or "data element") being computed along with its k nearest neighbor points, together form what is referred to herein as a "neighborhood" for such operation.

As described further herein, in some instances a desired neighborhood of data may be one that is sufficiently large to enable computation of several data points (e.g., several center points) within the neighborhood. For instance, suppose that a given computational operation employs seven neighboring data points on either side of a given data point in order to compute the given data point. In such an instance, a neighborhood having 15 data points in the X dimension is sufficient for computing the center data point. A larger neighborhood of 16 data points in the X dimension is sufficient to calculate the center two points. An even larger neighborhood with an X dimension of 64 data points allows the center 50 points to be computed. Thus, the desired neighborhood may be larger in some instances than what is required for merely computing a single data point, as employing such a larger neighborhood may increase efficiency and/or allow more computation to be accomplished per amount of memory bandwidth required, as discussed further below.

According to certain embodiments of the present invention, the general register set of a processing element is of insufficient size in one or more of its dimensions to store the desired neighborhood of data that is required for performing certain operations (e.g., for computing one or more data points using nearest-neighbor type of operations). That is, the general register set is of insufficient size in one or more of its dimensions to store the desired neighborhood data in a manner that maintains the relative positional arrangement of the data within the neighborhood. As such, the general register set is referred to herein as being size constrained or "neighborhood constrained" in that it is insufficient for fully storing the desired neighborhood of data in a manner that maintains the positional relationship between the data points within the neighborhood, such as may be needed for performing nearest-neighbor operations. For instance, the general register set may be insufficient to fully store all k nearest neighbor points (while maintaining the arrangement of the neighbor points) that are desired for computing one or more data points within the neighborhood.

As one example, suppose that certain computational operations desire a neighborhood made up of seven neighboring data points on each side of a center point value being computed. Further suppose that a general register set of a processing element is implemented as an 8×8 grid of function pipes containing general registers. Because the computational operation desires 7 data points on each side of the data point under computation (e.g., 7 data points to the right of the data point under computation and 7 data points to the left of the data point under computation), the 8×8 arrangement provided by the general register set in this instance fails to suffice for storing the neighborhood of data while maintaining the positional relationships of the data points in the neighborhood. For instance, the 8×8 arrangement of data does not allow for its center data point to have the desired 7 points to the right and 7 points to the left. Thus, the general register set is of insufficient size in at least one dimension (e.g., in the X dimension) in this example.

As described further herein, embodiments of the present invention provide systems and methods for effectively employing such a neighborhood constrained general register set in a processing element for performing neighborhood-based operations. As described below, in certain embodiments, a window access method is provided that enables such a neighborhood constrained general register set to appear larger in on or more of its dimensions, thereby enabling it to effectively be employed for storing the desired neighborhood of data in a manner that maintains the positional relationships of the data within the neighborhood.

In certain embodiments, the processing element is dynamically configurable to employ any of a plurality of different access methods for accessing its general registers. In one embodiment, the processing element is dynamically configurable to employ either a vector access method or a window access method. Thus, the window access method may be selected for use when a computational operation desires to store a neighborhood of data to the processing element's general registers for processing, and the processing element's general registers are of insufficient size in at least one dimension for storing the neighborhood while maintaining the arrangement of data within the neighborhood.

The window access method of one embodiment uses a set of window configuration registers to indirectly access the general registers. As discussed further herein, this indirection allows the limited number of function pipes (e.g., 8×8 in one example) to appear much larger (e.g., up to 64×64 in one embodiment). The appearance of a much larger number of function pipes is desirable because it makes neighborhood-based operations, such as finite difference algorithms, much more memory bandwidth efficient.

In one embodiment, a processing element is provided that comprises a plurality of function pipe groups that each includes a plurality of function pipes. Each function pipe includes general registers for the processing element, and thus together the function pipes provide a general register set for the processing element. The plurality of function pipe groups correspond to an X dimension of general registers for the processing element, and the plurality of function pipes contained in each group correspond to a Y dimension of the general registers. For instance, in one exemplary implementation, eight function pipe groups are included in the processing element, where each function pipe group includes eight function pipes, thereby resulting in 8×8 arrangement of the general register set. In one embodiment, a plurality of general registers are included in each function pipe for storing a plurality of data points. For instance, in one exemplary implementation 2,048 general registers that are each capable of storing a 32-bit data value (or "data point") are included in each function pipe. The number of such general registers contained in each function pipe may be considered as the "depth" or Z dimension of the general register set.

In one embodiment, a neighborhood of data values that exceed one or more dimensions of the general register set is nevertheless stored to the general registers. That is, a window access method is employed for mapping the neighborhood of data values to the general registers. Further, the positional relationships of the data values in the neighborhood are maintained in the general registers through such mapping such that nearest neighbor types of operations may be performed on the data values by the processing element.

In one embodiment, the desired neighborhood of data values to be stored to the processing element's general registers comprises an arrangement of data values that have positional relationships in 3 dimensions, i.e., X, Y, and Z dimensions. According to one embodiment of the window access method, the neighborhood of data values is partitioned into a plurality of window panes. In one embodiment, the number of window panes may be selected as a function of the size of the X and Y dimensions of the neighborhood and the size of the X and Y dimensions of the general register set. For instance, suppose that the neighborhood is a 32×32×8 arrangement of data values e.g., 32-bit data values), such that the X and Y dimensions are each 32. Further suppose that the general register set of the processing element is 8×8. In this case, the number data points in the X and Y dimensions of the neighborhood (i.e., 32×32) may be divided by the X and Y dimensions of the general register set (i.e., 8×8), thereby resulting in the 4×4 arrangement of window panes.

In one embodiment, each window pane has a plurality of the data values from the neighborhood of data arranged therein in 3 dimensions, i.e., X, Y, and Z. The X and Y dimensions of each window pane, in one embodiment, correspond to that of the general register set of the processing element. For instance, continuing with the above example, each pane contains an 8×8 arrangement of data values, corresponding to the 8×8 general register set arrangement of the processing element. Thus, each of the 4×4 window panes includes an 8×8 arrangement of data values (e.g., 32-bit data values).

Further, in one embodiment, the depth of each window pane corresponds to the depth (or Z dimension) of the neighborhood of data. As such, through mapping the window panes to the general registers of the processing element, the total number of general registers included in each function pipe may be grouped into blocks of general registers corresponding in size to the size of the depth (or Z dimension) of the neighborhood of data. For instance, continuing with the above example in which the 32×32×8 neighborhood is being stored to the general registers of a processing element in which each function pipe has 2,048 general registers, such 2,048 general registers of each function pipe are grouped into 256 blocks of 8 general registers (corresponding to the depth of 8 of the neighborhood).

The neighborhood of data is stored to the general registers in accordance with the window pane mapping for processing of the data by the processing element, which may include nearest-neighbor types of computations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4 shows an example illustrating a window of data that is divided into an 8×8 array of window panes, rather than the exemplary 4×4 array of window panes shown in FIG. 3;

FIG. 5 shows the format for a Window Pane Map register that may be implemented for a processing element according to one embodiment;

DETAILED DESCRIPTION

Figure 1:
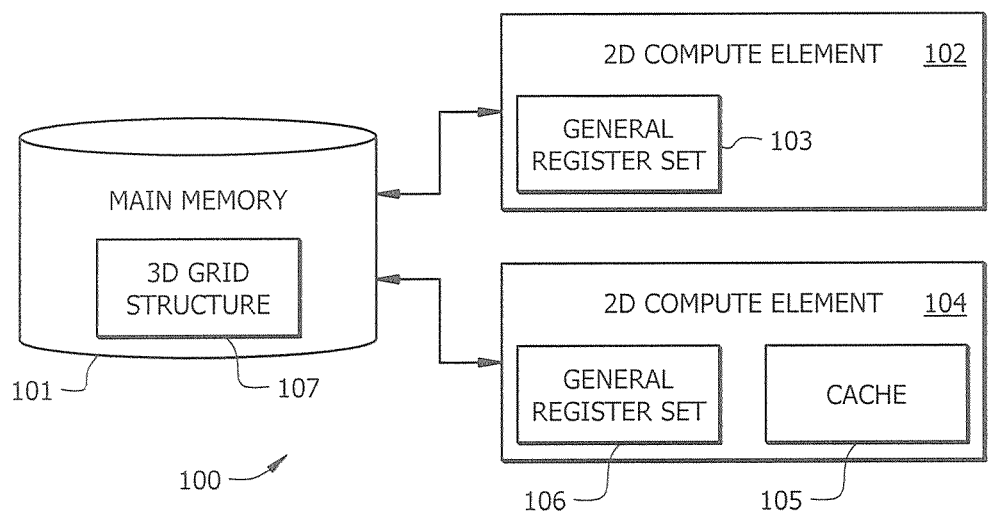
FIG. 1 shows a block diagram of an exemplary system according to one embodiment of the present invention.

FIG. 1 shows a block diagram of an exemplary system 100 according to one embodiment of the present invention. In this example, system 100 comprises a main memory 101, which is accessed by processing elements 102 and 104, which may each be a CPU, GPU, host processor, co-processor, or other processing element that is communicatively coupled with memory 101 for accessing and processing data from such memory 101. While two processing elements 102 and 104 are shown for discussion purposes in the exemplary system 100 of FIG. 1, embodiments of the present invention may be implemented with any number (one or more) of processing elements. Thus, embodiments of the present invention are not limited as to the number of processing elements included in a system.

Further, as discussed below, the exemplary processing element 102 is an example of a processing element that does not have a cache (i.e., a "cacheless processing element"), while the exemplary processing element 104 is an example of a processing element that does have a cache (or a "cache-implemented processing element"). While an exemplary system 100 that includes both a cacheless processing element 102 and a cache-implement processing element 104 is shown for discussion purposes, embodiments of the present invention may be implemented with a system that includes one or more of both types of processing elements (e.g., a system that has one or more cacheless processing elements and one or more cache-implemented processing elements), and embodiments of the present invention may likewise be implemented with a system that includes one or more processing elements of either type (e.g., a system with only one or more cacheless processing elements, or a system only one or more cache-implemented processing elements).

Thus, embodiments of the present invention are not limited to the exemplary implementation shown in FIG. 1, but may likewise be employed in systems having any number of processing elements that are either (or that include both) cacheless or cache-implemented processing elements. In addition, those of ordinary skill in the art will readily recognize that additional elements may be included in a given system implementation, which are not represented in the simplified block diagram of FIG. 1 so as to avoid unnecessarily detracting focus from pertinent details of the exemplary embodiment being described.

In the illustrated example, processing element 102 is an example of a processing element which does not have a cache (i.e., a cacheless processing element), and thus it is consistent with an example of a cacheless co-processor that may be implemented in system 100. As further examples of systems on which embodiments of the present invention may be implemented, certain embodiments may be implemented within any one or more of the exemplary systems (e.g., including the host processors, co-processors, and/or memory and/or cache systems) described in co-pending and commonly assigned U.S. patent application Ser. No. 11/841,406 titled "MULTI-PROCESSOR SYSTEM HAVING AT LEAST ONE PROCESSOR THAT COMPRISES A DYNAMICALLY RECONFIGURABLE INSTRUCTION SET" filed Aug. 20, 2007; co-pending and commonly assigned U.S. patent application Ser. No. 11/854,432 titled "DISPATCH MECHANISM FOR DISPATCHING INSTRUCTIONS FROM A HOST PROCESSOR TO A CO-PROCESSOR" filed Sep. 12, 2007; co-pending and commonly assigned U.S. patent application Ser. No. 11/969,792 titled "MICROPROCESSOR ARCHITECTURE HAVING ALTERNATIVE MEMORY ACCESS PATHS" filed Jan. 4, 2008; co-pending and commonly assigned U.S. Pat. No. application Ser. No. 12/186,344 titled "MEMORY INTERLEAVE FOR HETEROGENEOUS COMPUTING" filed Aug. 5, 2008; co-pending and commonly assigned U.S. patent application Ser. No. 12/186,372 titled "MULTIPLE DATA CHANNEL MEMORY MODULE ARCHITECTURE" filed Aug. 5, 2008; co-pending and commonly assigned U.S. patent application Ser. No. 12/263,203 titled "CO-PROCESSOR INFRASTRUCTURE SUPPORTING DYNAMICALLY-MODIFIABLE PERSONALITIES" filed Oct. 31, 2008; and co-pending and commonly assigned U.S. patent application Ser. No. 12/263,232 titled "DYNAMICALLY-SELECTABLE VECTOR REGISTER PARTITIONING" filed Oct. 31, 2008, the disclosures of which are hereby incorporated herein by reference. Of course, embodiments of the present invention are not limited to implementation within the exemplary types of systems described in the above-referenced patent applications, but may likewise be implemented within various other types of computing systems.

Processing element 102 includes a processor register file, referred to herein as a general register set 103. As discussed above, the processing element's general register set is where data values are held while the processing element is performing computation on such data values. As discussed further herein, an instruction set executing on processing element 102 typically expressly manages the general register set 103 (e.g., expressly manages the movement of data into and out of general registers 103). As discussed further with respect to processing element 104 below, an instruction set typically does not expressly manage the movement of data into or out of a processing element's cache (but instead the instruction set typically instructs accesses of main memory 101 and the cache access is typically transparent to the instruction set).

In the illustrated example, system 100 further includes processing element 104 which does have a cache 105 (i.e., is a cache-implemented processing element), as well as a separate general register set 106. Typically, a cache 105 is organized as a subset of memory system 101. Traditionally, an entire cache line of data, e.g., 64 bytes of data, is used as the unit of replacement in the cache. The cache is often associatively assigned to the memory, and it is typically managed automatically by the hardware implemented in the system. So, an application or software process typically does not know expressly when something is coming into the cache 105 or being ejected from the cache 105, but instead the cache operation is generally implemented by the hardware to be transparent in the path to memory 101.

Thus, traditionally an application or process does not actually reference the cache 105 directly, whereas the general registers (e.g., general register sets 103 and 106) are managed locations for data. For example, there may be "Register 1," "Register 2," and "Register 3" included in the general register set 106, and an instruction set executing on processing element 104 may specifically instruct the processing element 104 to access memory 101 and put a specified location of memory into Register 1. For instance, the instruction set may instruct processing element 104 to access a first location of memory 101 and place the location into Register 1 of general register set 106, access a second location of memory 101 and place the location into Register 2 of general register set 106, and then add the two values of Register 1 and Register 2 and place the result in Register 3 of general register set 106. If any of the location(s) being requested from memory 101 is already in cache 105 from a previous reference, then the access may be very quick because it is available locally within the processing element 104.

The loading of data from memory 101 into cache 105 and/or ejecting data from cache 105 is typically handled by the hardware in a manner that is transparent to the instruction set, such that the instruction set does not expressly manage the movement of data into or out of the cache 105 as it does with the general register set 106. So, as is well-known in the art, the cache of a processing element (such as cache 105 of processing element 104) may accelerate the data access and/or increase the bandwidth to memory 101, whereas the general registers of a processing element (such as general registers 103 and 106 of processing elements 102 and 104) are where an instruction set actually manages the data being processed. As is well-known in the art, a processing element's cache, such as cache 105, is a data storage mechanism used by the processing element to reduce the average time to access memory 101. The cache is typically a smaller, faster memory (than main memory 101) which stores copies of the data from the most frequently used main memory locations. As long as most memory accesses are cached memory locations, the average latency of memory accesses will be closer to the cache latency than to the latency of main memory. Typically, when a cache-implemented processing element 104 needs to read from or write to a location in main memory 101, it first checks whether a copy of that data is in the cache 105. If so, the processing element 104 immediately reads from or writes to the cache 105, which is typically much faster than reading from or writing to main memory 101.

Generally, each location in memory 101 has a datum (or "cache line"), which in different designs typically ranges in size from 8 to 512 bytes. The size of the cache line is usually larger than the size of the usual access requested by an instruction being executed by the processing element, which typically ranges from 1 to 16 bytes. Each location in memory 101 typically also has an index, which is a unique number used to refer to that location. The index for a location in main memory 101 is called an address. Each location in the cache 105 typically has a tag that contains the index of the datum in main memory 101 that has been cached. In a processing element's data cache 105, these entries are typically called cache lines or cache blocks.

Processing elements 102 and 104 may access blocks of data from memory 101 via memory lines. In general, a memory line refers to a block of main memory. When a memory line is written to a processing element's cache then it is called a cache line. Generally, a memory line and a cache line are the same size i.e., same number of bytes).

In traditional computer implementations, when a processing element accesses memory 101, the processing element accesses an entire memory line, not just a small portion of it because standard DIMMs (and the DRAMs on the DIMMs) are organized in banks with fixed access quantities that a processing element can read out of them. For instance, the minimum quantity for a memory line on a standard DIMM today is either 32-bytes or potentially 64-bytes, matching the common size of the caches of processors.

In the example of FIG. 1, main memory 101 includes 3D data structure 101, which may be data stored in a grid structure 107, such as a 3D array type of data structure, for example. As discussed above, such 3D data structure comprises data representing a 3D object. The 3D data structure 101 is processed by one or more of the 2D processing elements (or "2D compute elements") 102 and 104. As discussed further hereafter, the general register set of one or more of the processing elements 102 and 104 (e.g., general registers 103 and 106) is of insufficient size to store a desired neighborhood of data in a manner that maintains the relative positional arrangement of the data within the neighborhood for performing certain neighborhood-based operations. That is, the general register set is of insufficient size in at least one dimension for fully storing the desired neighborhood of data in a manner that maintains the relative data arrangement within the neighborhood, such as may be needed for performing nearest-neighbor operations when processing the 3D data structure. However, as discussed further herein, embodiments of the present invention provide techniques for managing the data so as to enable the processing element having such a general register set of insufficient size to nevertheless effectively perform the desired neighborhood-based operations. According to certain embodiments, a window access method is provided that enables the general register set to appear to have a larger size in one or more dimensions than it actually has.

Processing elements 102 and 104 are referred to herein as 2D processing elements because they each store data being operated on in a 2D arrangement (e.g., within general registers 103 and 106), as opposed to a 3D structure. Thus, the 2D processing element 102 may be computing on a 2D arrangement of data, say an 8×8 arrangement of data. In each clock cycle of the processing element's clock, the 2D arrangement of data may be operated on. Time (e.g., advancing clock cycles) may be used for effectively achieving a third dimension. Thus, the data elements may be stored in a 2D data arrangement within the general register set of the processing element (e.g., general registers 103 or 106), and the 2D data arrangement may then be processed by the processing element one clock at a time.

As is well known in the art, for many types of compute operations on 3D data, the data is effectively organized into neighborhoods and use of some number of "nearest neighbors" are often relied upon for processing. One example of a specific application that employs nearest-neighbor type of operations is a 3D Reverse Time Migration algorithm where a 3D wave equation is solved using a 3D stencil operator. The 3D stencil operator has a center point, and some number of points in the +x, −x, +y, −y, +z, and −z directions. The typical sizes for the stencil operator for Seismic applications tends to be $4^{th}$, $8^{th}$ and $14^{th}$ order, where the order indicates the total number of points in one of the dimensions (excluding the center point). This, as well as many other types of applications, are well-known in the computer processing arts as employing nearest-neighbor type of operations.

Thus, when processing 3D data, the data is often organized into a neighborhood of data (e.g., a neighborhood of data elements representing adjacent or "neighboring" portions of the 3D structure that the data represents) for processing, such as for performing certain computational operations. For instance, in performing many operations, some "k" number of nearest neighbors of a given data element are used for performing some computation involving the given data element. Thus, when performing certain processing operations on a 3D grid structure, a neighborhood type of processing is employed which may require using k nearest neighbor points, which are those data points closest to (or neighboring) the data point trying to be solved. In certain operations, the value of k may encompass seven or more neighbor points on each side of the center point value being computed, for example. The full data desired for performing such nearest neighbor operations, e.g., the data point (or "data element") being computed along with its k nearest neighbor points, together form what is referred to herein as a "neighborhood" for such operation.

As described further herein, in some instances a desired neighborhood of data may be one that is sufficiently large to enable computation of several data points (e.g., several center points) within the neighborhood. For instance, suppose that a given computational operation employs seven neighboring data points on either side of a given data point in order to compute the given data point. In such an instance, a neighborhood having 15 data points in the X dimension is sufficient for computing the center data point. A larger neighborhood of 16 data points in the X dimension is sufficient to calculate the center two points. An even larger neighborhood with an X dimension of 64 data points allows the center 50 points to be computed. Thus, the desired neighborhood may be larger in some instances than what is required for merely computing a single data point, as employing such a larger neighborhood may increase efficiency and/or allow more computation to be accomplished per amount of memory bandwidth required, as discussed further below.

According to certain embodiments of the present invention, the general register set of a compute element is of insufficient size in one or more of its dimensions to store the desired neighborhood of data that is required for performing certain operations (e.g., for computing one or more data points using nearest-neighbor type of operations). That is, the general register set is of insufficient size in one or more of its dimensions to store the desired neighborhood data in a manner that maintains the relative positional arrangement of the data within the neighborhood. As such, the general register set is referred to herein as being size constrained or "neighborhood constrained" in that it is insufficient for fully storing the desired neighborhood of data in a manner that maintains the positional relationship between the data points within the neighborhood, such as may be needed for performing nearest-neighbor operations. For instance, the general register set may be insufficient to fully store all k nearest neighbor points (while maintaining the arrangement of the neighbor points) that are desired for computing one or more data points within the neighborhood.

As one example, suppose that certain computational operations desire a neighborhood made up of seven neighboring data points on each side of a center point value being computed. Further suppose that a general register set (e.g., general register set 103 or 106 of FIG. 1) is implemented as an 8×8 grid. Because the computation operation desires 7 data points on each side of the data point under computation (e.g., 7 data points to the right of the data point under computation and 7 data points to the left of the data point under computation), the 8×8 arrangement provided by the general register set in this instance fails to suffice for storing the neighborhood of data while maintaining the positional relationships of the data points in the neighborhood. For instance, the 8×8 arrangement of data does not allow for its center data point to have the desired 7 points to the right and 7 points to the left. Thus, the general register set is of insufficient size in at least one dimension (e.g., in the X dimension) in this example.

While several examples are provided herein that illustrate the concepts as being useful for processing of 3D data (e.g., because that type of processing commonly requires a neighborhood of data that the general register set of the processing element is not of sufficient size for storing), embodiments of the present invention may also be employed for processing other types of data (other than 3D data) for which such neighborhood type of processing is desired. For instance, the above-mentioned Reverse Time Migration algorithm may be performed in 2D and/or 3D. Wave equations are also used for electromagnetic wave propagation simulations such as for antenna design. Examples of other basic algorithms include convolutions and correlations functions (in 2D and/or 3D). Thus, while the data 107 is described in this example as being 3D data, in certain embodiments it may be some other type of data, such as 2D data, and embodiments of the present invention may still be beneficial to employ in some instances (e.g., when a processing element's general register is neighborhood constrained such that it is insufficient for storing a desired neighborhood of the data).

As described further herein, embodiments of the present invention provide systems and methods for effectively employing such a neighborhood constrained general register set in a processing element for performing neighborhood-based operations. As described below, in certain embodiments, a window access method is provided that enables such a neighborhood constrained general register set to appear larger in on or more of its dimensions, thereby enabling it to effectively be employed for storing the desired neighborhood of data in a manner that maintains the positional relationships of the data within the neighborhood.

According to one embodiment of the present invention, a 2D processing element (e.g., processing element 102 and/or 104) comprises an application engine having one or more function pipes implementing the compute element's general registers. For instance, in certain embodiments, the 2D processing element may be a co-processor implemented in a multi-processor system, such as the co-processor as described in co-pending and commonly-assigned U.S. patent application Ser. No. 12/263,203 (hereafter "the '203 application") titled "CO-PROCESSOR INFRASTRUCTURE SUPPORTING DYNAMICALLY MODIFIABLE PERSONALITIES" filed Oct. 31, 2008 and/or the co-processor as described in co-pending and commonly-assigned U.S. patent application Ser. No. 12/263,232 (hereafter "the '232 application") titled "DYNAMICALLY-SELECTABLE VECTOR REGISTER PARTITIONING" filed Oct. 31, 2008, the disclosures of which are incorporated herein by reference. Of course, the present invention is not limited to application with a co-processor in a multi-processor system, and particularly not limited to the exemplary co-processor implementations described in the above-mentioned '203 and '232 applications. Instead, those exemplary co-processors are merely illustrative of one type of 2D processing element with which embodiments of the present invention may be employed. Embodiments of the present invention may be readily adapted for application with any type of 2D processing element having a neighborhood constrained general register set, such as described further herein.

As described in one or both of the above-mentioned '203 and '232 applications, in certain implementations the co-processor includes one or more application engines that are dynamically configurable to any of a plurality of different personalities. For instance, the application engine(s) may comprise one or more reconfigurable function units (e.g., the reconfigurable function units may be implemented with FPGAs, etc.) that can be dynamically configured to implement a desired extended instruction set. In certain embodiments, the co-processor also comprises an infrastructure that is common to all the plurality of different application-specific personalities. For instance, the co-processor may comprise a memory management infrastructure that is common to all the plurality of different application-specific personalities. Such memory management infrastructure may comprise a virtual memory and/or physical memory infrastructure that is common across all of the personalities. As another example, the co-processor may comprise a system interface infrastructure for interfacing with a host processor, wherein the system interface infrastructure is common to all the plurality of different application-specific personalities.

Figure 2:
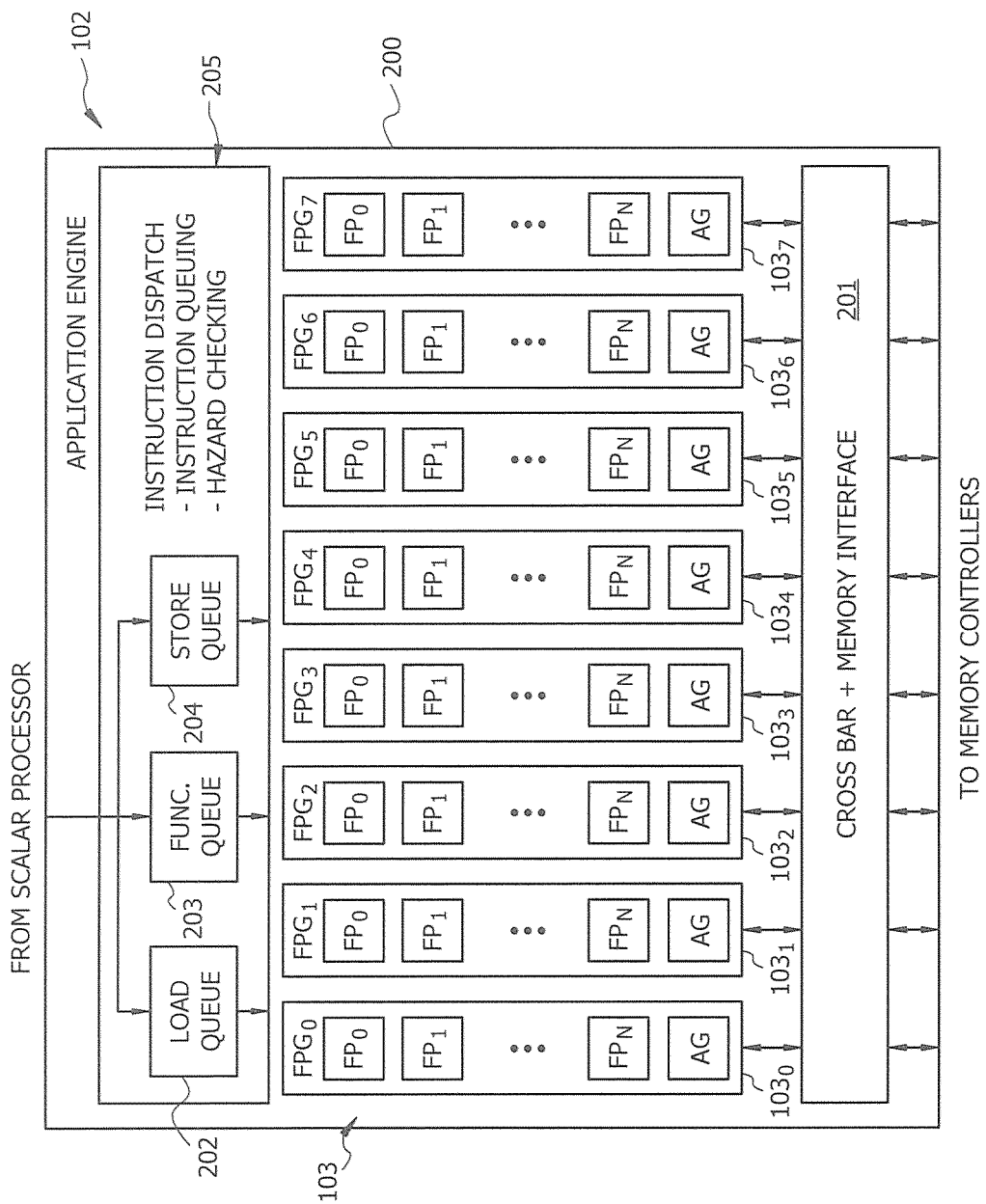
FIG. 2 shows a block diagram representing an exemplary implementation of a 2D processing element according to one embodiment of the present invention.

FIG. 2 shows a block diagram representing an exemplary implementation of a 2D processing element 102 according to one embodiment of the present invention. In the exemplary architecture shown in FIG. 2, processing element 102 comprises one or more application engines 200, which may be implemented to have dynamically-reconfigurable personalities, such as described further in the above-mentioned '203 and 232 applications. Of course, in other embodiments, the application engine 200 may instead be implemented with a fixed personality that is not dynamically reconfigurable.

Each application engine 200 is operable to process instructions of an application. For instance, in a system in which processing element 102 is a co-processor, application engine 200 may execute instructions of an application that have been dispatched from a host processor of the multi-processor system to the co-processor.

In the example of FIG. 2, the infrastructure of application engine 200 includes a cross bar and memory interface 201, instruction dispatch 205, and function pipe groups $103_0$-$103_7$ (also labeled $FPG_0$-$FPG_7$). The memory interface 201 is coupled to a memory controller (not shown) for accessing the 3D data structure 107 stored in main memory 101 in FIG. 1. The cross bar allows access by all of the function pipes within this processing element 102 to any location in main memory 101.

The instruction dispatch 205 allows instruction queuing and hazard checking to be performed. Application engine 200 receives instructions from a decode block in a scalar processor (not shown), and the instruction dispatch 205 then sends those instructions to the appropriate execution units within the processing element 102 at the appropriate point in time, based on hazard checking. The load queue 202, function queue 203, and store queue 204 are used to hold instructions until they are ready to be executed in this exemplary architecture. The load queue 204 holds memory load instructions (i.e., memory to general register), the function queue 203 holds arithmetic operations (i.e., general register to general register operations), and the store queue 204 hold store instructions (i.e., general register to memory).

Function Pipe Groups $FPG_0$-$FPG_7$ are where the actual computation or processing of 3D data 107 is performed within this processing element 102. While eight function pipe groups are shown in the example of FIG. 2, in other embodiments any other desired number of function pipe groups may be implemented within the scope of the present invention. Within each function pipe group there are multiple function pipes $FP_0$-$FP_N$, where each function pipe includes a plurality of general registers, plus some compute capability, such as floating point multiply or floating point add type operations as examples. Thus, the general register set 103 of processing element 102 in FIG. 1 is implemented in the example of FIG. 2 by the general registers of the function pipes $FP_0$-$FP_N$. In the example of FIG. 2, the processing element 102 is considered a 2D processing element because it has a 2D set of compute function pipes; one dimension refers to the number of function pipe groups (e.g., the eight groups $FPG_0$-$FPG_7$ shown in the example of FIG. 2), and the second dimension refers to the number of function pipes within a function pipe group (e.g., the "N" function pipes $FP_0$-$FP_N$ shown in the example of FIG. 2).

As a concrete example of one implementation, various details concerning the number of function groups, the number of function pipes in each group, and the size of general registers in the each function pipe are described as an implementation referred to herein as "Implementation A." Of course, while the exemplary "Implementation A" provides one illustrative example, embodiments of the present invention are not limited to the details described for such implementation. Rather, the concepts described herein may likewise be applied to other system implementations having different numbers of function pipe groups, function pipes in each group, and/or size of general registers.

In Implementation A, eight function pipe groups are implemented (such as function pipe groups $FPG_0$-$FPG_7$ as shown in FIG. 2), and eight function pipes are implemented within each group (e.g., N=7 in FIG. 2 such that there are eight function pipes, $FP_0$-$FP_7$, implemented), thereby resulting in 64 total function pipes within application engine 200. Again, each function pipe has a plurality of general registers. In Implementation A, each function pipe contains 2,048 general registers. Each function pipe can pull some data out of its general register, perform an operation and store the results back in that general register. Then, in the next clock, that function pipe can pull a second set of results or operands out of the general register, perform an operation and store them back in the general register. So, each of the 64 function pipes in this Implementation A may be performing an operation every clock. The third dimension is effectively time within a function pipe.

General Registers (GR). In one exemplary embodiment, each function pipe has a set of general registers. General registers can be loaded/stored to memory. General registers also provide the input operands to the function pipes. In the exemplary Implementation A, the general registers of each function pipe are organized as 2,048 32-bit register elements, which are thus capable of storing 2,048 32-bit data points. Of course, in other implementations, a different number of general registers may be implemented within the function pipes.

In one embodiment of the present invention, the general registers can be accessed using two different methods: directly as a vector of register elements, or indirectly through a window. Thus, according to certain embodiments, the processing element may be dynamically configured to support access of its general registers via a vector access method or via a window access method as described further herein. As discussed further below, the window access method may be employed in certain embodiments when the size of a neighborhood of data that is to be processed exceeds the size of the general register set in at least one dimension so that the neighborhood of data cannot be stored to the general register set while maintaining the relative positional arrangement of the data within the neighborhood. While certain embodiments of the present invention provide a processing element that is dynamically configurable as to the access method utilized for accessing the processing element's general registers, in other embodiments the processing element may not be so dynamically configurable as to the access method utilized—for instance, in certain embodiments, the processing element may have the below-described window access method fixed as the access method employed for accessing its general registers.

According to one embodiment, certain applications may be compiled with instructions to reference the general registers using the vector register method, while the indirect access method (or "window access method") may be used in optimized assembly level libraries, as well as possibly by compiled application instructions in certain constrained situations. The following two exemplary assembly level instructions show how the two methods are indicated to the assembler according to one embodiment:

ARITH V0, V1, V2
ARITH W0, W1, W2

The above example shows how an arithmetic operation (ARITH) may be performed that specifies whether to use the vector register access method or the window access method. The first arithmetic operation shown specifies use of a vector register access method, which adds vector register V0 to vector register V1 and puts the result in vector register V2. The second arithmetic operation shown instead specifies use of a window access method, which adds window W0 to window W1, and puts the result in window W2. Each window (e.g., each of window W0, W1, and W2) may correspond, for example, to the window (or desired "neighborhood") of data 301 discussed below with FIG. 3. As discussed herein, such window may exceed the size of one or more dimensions of the general register set of a processing element, and thus the window access method described further below (e.g., employing panes) may be utilized in certain embodiments.

Vector Registers Access Method. The vector register access method, according to one embodiment, provides a simple way to access the general registers without the need to first initialize any window configuration registers. With the vector register access method of the exemplary Implementation A, for example, the 2,048 general registers of each function pipe are divided into 32 registers with 64 elements (e.g., 64 32-bit data points) each. The 32 registers are referred to as V0-V31. V0 is mapped to GR[0]-GR[63], V1 as GR[64]-GR[127], etc.

Window Access Method. The window access method, according to one embodiment, provides a very flexible method to access the general registers, such as may be desired to achieve performance on finite difference expressions or other computations involving a neighborhood of data. As discussed further herein, the window access method of certain embodiments allows for processing of a desired neighborhood of data by a processing element that is neighborhood-constrained (i.e., that has a general register set of insufficient size for fully storing the desired neighborhood of data in a manner that maintains the relative positional arrangement of the data within the neighborhood).

The window access method of one embodiment uses a set of window configuration registers, such as those described further below, to indirectly access the general registers. As discussed further herein, this indirection allows the limited number of function pipes (e.g., 8×8 in the example illustrated in FIG. 2) to appear much larger (e.g., up to 64×64 in one embodiment). The appearance of a much larger number of function pipes is desirable because it makes neighborhood-based operations, such as finite difference algorithms, much more memory bandwidth efficient.

Figure 3:
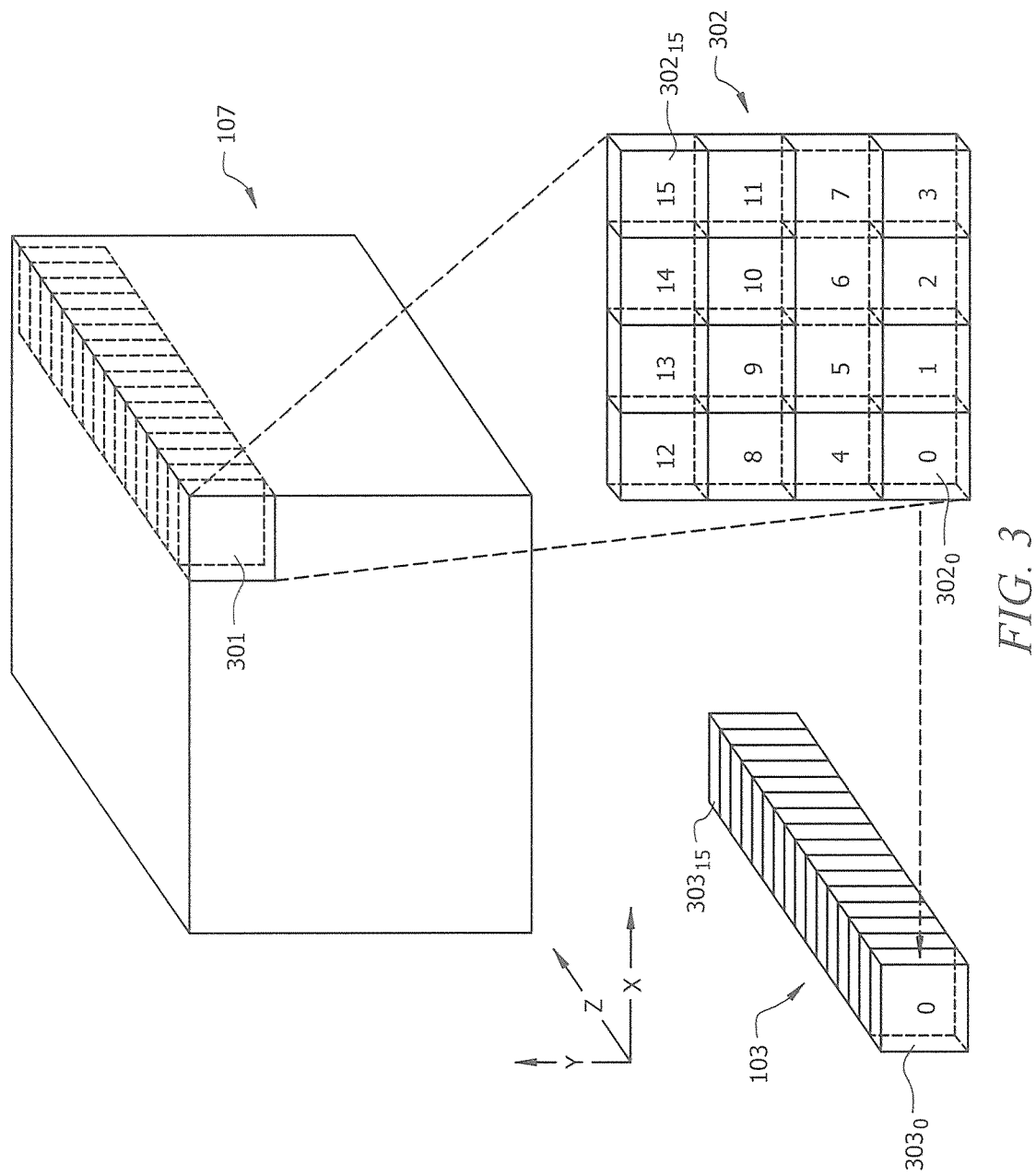
FIG. 3 shows an example of mapping a neighborhood of a 3D data structure to a neighborhood-constrained general register in accordance with one embodiment of the present invention.

FIG. 3 shows an example of mapping a neighborhood of 3D data structure 107 to a neighborhood-constrained general register set 103 in accordance with one embodiment of the present invention. That is, FIG. 3 shows an example of a mapping that may be achieved when employing the window access method in accordance with one embodiment of the present invention. The example of FIG. 3 shows one example of how data from 3D data structure 107 may be mapped to the general registers 103 implemented by the function pipes $FP_0$-$FP_N$ of the function pipe groups $FPG_0$-$FPG_7$ in the example of FIG. 2. The 3D data structure 107 resides in main memory 101 (as shown in FIG. 1). The 3D data structure 107 is too large to be fully stored in the 2D processing element 102. So, at any point in time, processing element 102 only works on a relatively small window (or "neighborhood") within the 3D data structure, such as a window 301. So, a window 301 of data is determined within the 3D data structure 107. The window 301 of data may also be referred to as a neighborhood of data.

As mentioned above, in order to be effective for many operations, a larger 3D window 301 (or "neighborhood" of data) is often desired beyond what the general register set 103 of processing element 102 is capable of holding in a manner that maintains the positional arrangement of the data within the window (or "neighborhood"). Thus, general register set 103 is, in such instance, neighborhood constrained because it is of insufficient size to fully store the entire neighborhood of data contained in window 301 in a manner that maintains the positional arrangement of the data within the window 301. While this example is discussed herein with reference to general register set 103 of cacheless processing element 102, the window access method may likewise be employed for accessing general register set 106 of a cache-implement processing element 104.

As discussed above, the 3D data 107 comprises data points that are arranged in main memory according to a positional relationship that the data points have to each other, and such relative arrangement is important to maintain for many neighborhood-based computations. For instance, the data values may be arranged consistent with the positional relationship of the corresponding physical items that the data points represent in a real-world object. Thus, the data values contained in the window 301 are arranged according to their positional relationship. Further, it is generally desirable to maintain the positional arrangement of the data values within the processing element's general register set for performance of nearest-neighbor type of computational operations.

For example, suppose that a nearest-neighbor computational operation desires to use the 7 nearest neighbors on either side of a data point that is being computed, and further suppose that a general register set provides an 8×8 grid for storing data points. In this example, such an 8×8 grid would be sufficient for storing all of the 15 data points needed for the desired computation, but the 8×8 grid is insufficient for storing the neighborhood of data in a manner that maintains the positional arrangement of such data. For instance, the total 64 data points that can be stored in the 8×8 grid would be sufficient for storing the total 15 data points that would be needed in the computation (i.e., the 7 points to the left, the 7 points to the right, and the center point under evaluation), but the data points would have to be "wrapped" around the 8×8 grid in some way and thus the relative positional arrangement of the data points in the neighborhood would not be maintained. Because the 8×8 grid does not have enough "X" dimension in this example to allow for the desired 15 points, the relative positional arrangement of the data would not be maintained within the general register set.

Thus, according to embodiments of the present invention, the general register set of a processing element possesses insufficient size in one or more dimensions to fully store the desired neighborhood of data while maintaining the relative positional arrangement of the data points in the neighborhood. As discussed further hereafter, according to certain embodiments of the present invention, a window access method is employed to provide the appearance of large dimensions (e.g., X and Y dimensions) for a window of data being stored to the general register set. For instance, if the X dimension is 15 (seven points on either side of the center), then only the center point can be computed. However, if the X dimension is 16, then there is sufficient data to calculate the center two points. With an X dimension of 64, the center 50 points can be computed. Thus, the efficiency increases significantly as the size of the dimension(s) of the window of data being stored to the general register is increased. With 15 data points, the ratio of compute to X dimension is 1:15. With 64 data points, the ratio of compute to X dimension is 50:64. The higher the ratio, the more compute that may be accomplished per amount of memory bandwidth required.

As one example, a larger window 301 may be desired than what the 8×8 function pipe of Implementation A can hold within its X and/or Y dimensions. Again, in Implementation A, eight function pipes are implemented within a function group (e.g., N=7 in FIG. 2 such that there are eight function pipes, $FP_0$-$FP_7$, implemented) and eight function groups ($FPG_0$-$FPG_7$) are implemented, thus resulting in an 8×8 grid, representing 8 data storage elements in the X direction and 8 data storage elements in the Y direction. Suppose that for many operations, significantly more data than that is desired in the X and Y dimensions, such as may be desired for computing a finite difference algorithm being performed or some other nearest-neighbor based computational algorithm that uses a neighborhood size that does not fit within the 2D 8×8 grid.

According to the exemplary embodiment illustrated in FIG. 3, the neighborhood window 301 of data is broken into panes 302. Panes 302 include multiple individual panes, shown as panes $302_0$ through $302_{15}$. This is just an example, and more or less individual panes may be included in a given implementation. For instance, in one exemplary implementation up to 8×8 panes (for a total of 64 individual panes) may be implemented.

Considering further the application of the window access method of FIG. 3 to the exemplary Implementation A, each of the individual panes $302_0$-$302_{15}$ is, in this example, 8×8 in the X, Y dimensions because they map to the actual function pipes of the application engine 200 discussed above with FIG. 2. That is, in one embodiment, each pane is set to correspond in the X, Y dimensions to the function pipe groups (e.g., 8) and the function pipes in each group (e.g., 8), respectively. Since the panes 302 are implemented in this example as a 4×4 grid of individual panes, and each individual pane is 8×8 in size, this achieves 32×32 data points within the panes 302.

Further, each of the window panes has a corresponding depth. The depth of each window pane refers to how far deep into the function pipe's general registers you go. So, a depth of 8 means that each of the window panes consumes 8 general registers (e.g., 8 32-bit data points) within each function pipe. In the exemplary Implementation A, each function pipe has 2,048 general registers. If those general registers are split up into blocks of eight, as in a general register block of 8, this results in 256 general register blocks, which is sufficient to provide multiple windows at maximum window size of 8×8 panes.

So, each of the window panes within paned window 302 is a block of general registers, which are essentially stacked up as shown in general register stack 103 in FIG. 3. If neighborhood window 301 is divided into 16 individual panes, $302_0$-$302_{15}$, and each of the individual window panes is 8 in depth (i.e., a block of registers 8 deep), this results in 8×16 which is 128 general registers to represent the neighborhood window 301 within each function pipe. So, in the exemplary Implementation A, there exists 8×8 function pipes within application engine 200, where in each function pipe there are 256 general register blocks (of 8 general registers) available for use. The depth of the data window in FIG. 3 matches the general register block size (e.g., 8 in this example). So, FIG. 3 shows sixteen general register blocks 103 (i.e., $303_0$-$303_{15}$) organized as a 4×4 window pane array (i.e., panes $302_0$-$302_{15}$), providing a 32×32×8 element data window 301. So, the exemplary mapping of FIG. 3 may be used in order to enable a much larger neighborhood window of data 301 to be stored than may otherwise be stored in the 8×8 function pipes that are physically implemented.

Thus, FIG. 3 shows how a window 301 containing a neighborhood of data within a 3D data structure can be mapped (when employing the window access method of one embodiment of the present invention) to neighborhood-constrained general registers 103, such as to the general registers within the function pipes in the exemplary system of FIG. 2. For the illustrated example, suppose the desired neighborhood window 301 is 32 data elements wide (X dimension) by 32 data elements tall (Y dimension) by 8 data elements deep (Z dimension). Each data element may be a 32-bit data point, for instance. Data window 301 is subdivided into window panes 302, which in the example of FIG. 3 is a 4×4 array of individual window panes, $302_0$-$302_{15}$. In one embodiment, each window pane is the size of the 2D array of function pipes within an application engine 200. For instance, in the exemplary Implementation A, the 2D function pipe array within application engine 200 is 8×8, and thus as mentioned above, each window pane may thus be 8×8. Further, because the desired neighborhood of data 301 has a depth of 8 (in the Z dimension), the 2,048 general registers of each function pipe (of Implementation A) may be logically partitioned into 256 blocks of 8 registers to correspond to the depth of the data window 301. Further, each pane $302_0$-$302_{15}$ is likewise implemented to have a depth of 8.

Thus, in this example, the desired neighborhood window 301 contains 32×32×8 data points. Each pane $302_0$-$302_{15}$ is an 8×8×8 block of data. Accordingly, each pane maps to the 8×8 function pipes of Implementation A with 8 elements (e.g., 8 32-bit data points) per register file in each function pipe. As such, only 8 elements of the 2,048 elements in each function pipe's general registers are used to store a single pane. Since in the example of FIG. 3, the panes 302 are arranged as 4×4 (thus resulting in 16 total panes, $302_0$-$302_{15}$), with each pane containing an 8×8×8 block of data, the total data points (or elements) provided by the panes 302 is 32×32× 8, thereby sufficing to store the full neighborhood window 301. To store the 16 panes in the function pipes of Implementation A requires 8 elements per function pipe per pane times 16 panes. In other words, 128 elements (or 128 32-bit data points) are stored in each function pipe's general registers (of the 2,048 total per function pipe). Accordingly, through this use of the window access method, the general registers provided by the function pipes of Implementation A appear as having sufficient size in the X, Y, and Z dimensions to store the 32×32×8 neighborhood of data 301. As can be appreciated, because only 128 data elements of the available 2,048 in each function pipe are consumed for storing the desired neighborhood window 301, an even larger neighborhood window or multiple such neighborhood windows may be stored at any time within the general registers of processing element 102.

According to one embodiment, a number of registers may be used to dynamically configure the mapping of the window panes to the general registers in the manner illustrated in FIG. 3. Various registers that may be employed in one embodiment are described further below.

Window Pane Map (WPM). As discussed above, in the exemplary Implementation A, each application engine (AE) 200 includes an array of 8×8 function pipes, and each function pipe has its own set of general registers (e.g., 2,048 32-bit registers). Thus, there is an array of 8×8 general registers in such an implementation, with an effective depth (Z dimension) of 2,048. This array of general registers may be referred to as (or mapped to) a window pane 302, such as discussed above with the example of FIG. 3. Instructions executing within application engine 200 work on a window of data 301, which in one embodiment may contain an array of up to 8×8 window panes. Thus, while an array of 4×4 window panes are shown in the example of FIG. 3, certain embodiments enable a larger array (e.g., up to 8×8 in one embodiment) of panes to be utilized. In one embodiment, Window Pane Map registers are implemented for a processing element to specify the general registers for each window pane.

In one embodiment, the maximum number of panes in a window is fixed at 8×8, but of course this maximum number may be fixed to a different size in alternative implementations. The supportable maximum number of panes of a window may vary depending on the number of function pipe groups, the number of function pipes within each group, and/or the number of general registers within each function pipe in a given implementation. FIG. 4 shows an example illustrating a window of data (e.g., window 301 of FIG. 3) that is divided into an 8×8 array of window panes, rather than the exemplary 4×4 array of window panes shown in FIG. 3. In certain embodiments the maximum number of panes is 8×8, as shown in FIG. 4, but the number of panes utilized at any particular time by a processing element may be dynamically configured (e.g., by setting the Window Pane Map registers accordingly).

The size of each pane (i.e., the physical function pipe array size) is implementation dependent, and thus may likewise vary from implementation to implementation. One exemplary implementation (Implementation A) has a pane size of 8×8 (because the application engine of Implementation A has 8 function pipe groups each containing 8 function pipes); whereas platforms with larger function pipes (e.g., large computing resources, such as a larger number of FPGA resources) may be implemented to have larger pane sizes. The maximum window size in one implementation (Implementation A) is 64 by 64 (8 by 8 panes, with each pane being 8 by 8 function pipes), but of course such maximum window size may be fixed to a different size in alternative implementations. And, the maximum depth for each pane in this instance would be 32. In other words, 64 panes times a depth of 32 general registers for each pane totals the 2,048 general registers that are available in each function pipe in "Implementation A." In certain embodiments, a register setting may be provided that specifies the "depth," such as whether a block of 8 general registers is used for each pane versus whether some other depth, such as 32 general registers, is used. For instance, in one implementation, the Window Descriptor register has a Block Count (BC) field that specifies the number of general register blocks for each pane. Note that the Window Bounds register has FirstZ and LastZ fields. These fields indicate which elements within the general register blocks are to participate in an operation. If there are four general register blocks within a window pane, then there are 32 total general registers within each window pane. An application might set FirstX=0 and LastX=31 for all thirty-two elements to be included in an instruction operation, for example.

FIG. 5 shows the format for a Window Pane Map register that may be implemented for a processing element according to one embodiment. In this example, each Window Pane Map register specifies the general register base address for four window panes. Since a window has up to 64 window panes (8×8) in one exemplary embodiment (as discussed above), sixteen WPM registers are used in this example to specify the General Register (GR) base values for all 64 window panes.

Again, in the exemplary Implementation A, the general registers for each function pipe have 2,048 elements (or 2,048 32-bit data points), and general register elements are allocated in blocks of eight. Thus, for this exemplary Implementation A, there are 256 general register element blocks. Further, in the Implementation A, each Window Pane Map register's WPGRB field is eight bits wide, thus allowing the field to specify any one of the 256 general register blocks.

Figure 6:
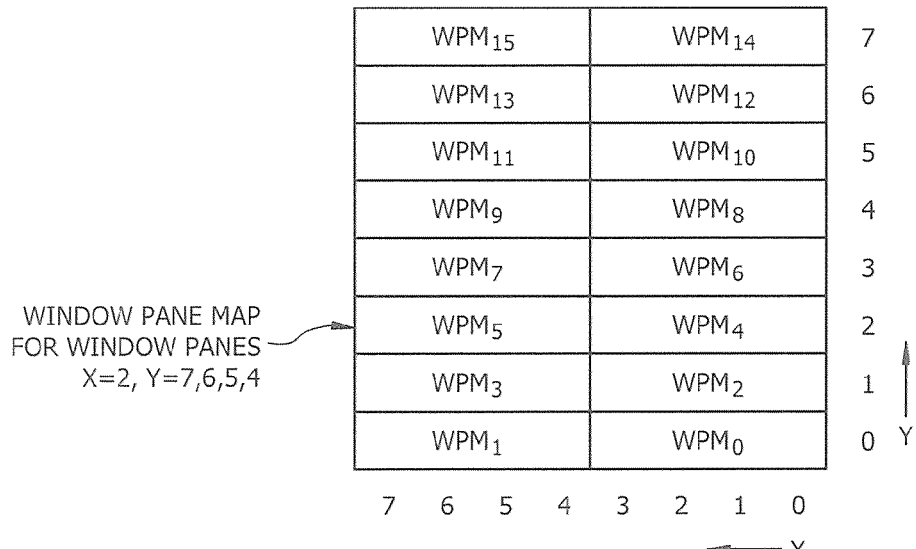
FIG. 6 shows the organization of the sixteen Window Pane Map registers used to specify a single data window according to one embodiment.

FIG. 6 shows the organization of the sixteen Window Pane Map registers used to specify a single data window according to one embodiment. It should be noted that only the Window Pane Map registers required for a data window need to be initialized in this exemplary embodiment. As an example, if a data window is required that uses four panes in the X dimension and four panes in the Y dimension (i.e., an array of 4×4 window panes, such as shown in FIG. 3), then only Window Pane Map registers WPM0, WPM2, WPM4, and WPM6 need be initialized.

According to one embodiment, multiple data windows can be defined. For instance, in one exemplary implementation, up to 8 data windows may be defined. Table I below shows the Window Pane Map registers used for each available data window in such an exemplary implementation.

TABLE 1

Window Pane Map Register Usage

| Data Window | Window Pane Map Registers |
|---|---|
| W0 | WPM0 - WPM15 |
| W1 | WPM16 - WPM31 |
| W2 | WPM32 - WPM47 |
| W3 | WPM48 - WPM63 |
| W4 | WPM64 - WPM79 |
| W5 | WPM80 - WPM95 |
| W6 | WPM96 - WPM111 |
| W7 | WPM112 - WPM127 |

Window Pane Map registers can be read and written using move instructions.

Window Descriptor (WD). According to one embodiment, there is a Window Descriptor register implemented in the processing element for each window, e.g., for each of eight windows WD0-WD7. As discussed above, in one embodiment, the base of a block of general registers is mapped to a window pane using the Window Pane Map registers. Further, the size of the block of registers and access method is specified in the Window Descriptor registers of the processing element, according to one embodiment. In one embodiment, general registers can be allocated to a window pane in increments of a general register block (e.g., eight register elements), from a minimum of one block to a maximum of eight blocks (64 elements).

The general register elements of a window pane can be accessed directly where the window's Z-dimension index directly specifies the element to access, or indirectly using an offset into the general register elements. The indirect access method is used, in one embodiment, to implement a general register rotating element mechanism.

As an example of the rotating mechanism, assume that a 14th order finite difference algorithm is being evaluated. This implies that in the Z dimension, for each input point, the seven points before and after is needed. If an operation is to calculate eight points in the Z dimension at a time (i.e., one general register block of results), then the operation needs the block under evaluation, plus the prior seven points and next seven points. This requires three blocks worth of points to hold the needed data.

Figure 7:
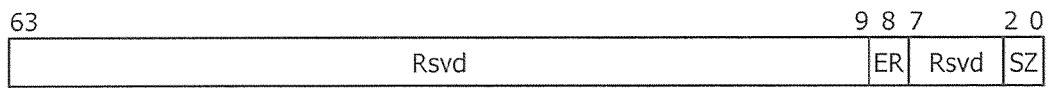
FIG. 7 shows the format of the Window Descriptor register according to one embodiment.

Assuming that the operation is traveling in the Z dimension in the inner loop, then once it completes the calculations for the current eight points, it needs to read in just eight new points (and use some of the pervious calculation's input points) to calculate the next eight points. The operation could move the previous data so that the eight new points are always written to the same locations, or use a rotating elements approach. In one embodiment, the base for a window's general registers is calculated using the Window Bounds Z Base value (WB.BZ). This WB.BZ value is incremented by the amount the data window is advanced in the Z dimension. The starting offset into a window's general registers is calculated as: GR element offset=WB.BZ modulo 'GR element count', where 'GR element count' is the number of elements allocated to a window pane. FIG. 7 shows the format of the Window Descriptor register according to one embodiment.

According to one embodiment, each Window Descriptor register contains a Block Count (BC) field and Element Rotation (ER) field, which are described further hereafter. The Block Count field (bits 2:0) of the Window Descriptor register specifies the number of general register blocks within each window pane. In one exemplary implementation, the following values are defined:

| BC Field Value | Number of blocks in Wind Pane |
| --- | --- |
| 0 | One |
| 1 | Two |
| 2 | Three |
| 3 | Four |
| 4 | Eight |
| 5-7 | Reserved |

The element rotation field (bit 8) of the Window Descriptor register specifies if element rotation is enabled. For instance, in one implementation, the value '1' in the element rotation field enables rotation.

Window Pane Valid (WPV). In certain embodiments, a Window Pane Valid register is implemented in the processing element for each window, e.g., for each of eight windows WD0-WD7. The Window Pane Valid register is used to specify which panes are to be included in the operation for an instruction. The Window Pane Valid register has an individual valid bit for each of the window panes of a window (e.g., for each of the 8×8 panes in one embodiment).

Figure 8:
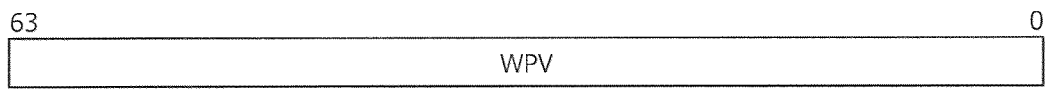
FIG. 8 shows the format of the WPV register according to one embodiment.

FIG. 8 shows the format of the WPV register according to one embodiment. Bit zero of the register is associated with window pane Y=0, X=0. Bit one is associated with window pane Y=0, X=1. The most significant bit is Y=7, X=7.

Window Bounds (WB). In certain embodiments, a Window Bounds (WB) register is implemented in the processing element for each window, e.g., for each of eight windows WD0-WD7. The Window Bounds register specifies which elements within a data window are to be written by the execution of an instruction. In the case of a store instruction, the Window Bounds register specifies which elements are to be stored to memory.

In one embodiment, the Window Bounds register is used when the general registers are accessed as vector registers. For vector register access, according to one embodiment, the valid values for the First X, Last X, First Y and Last Y fields are 0-7. The valid values for First Z and Last Z, according to one embodiment, are 0-63.

Figure 9:
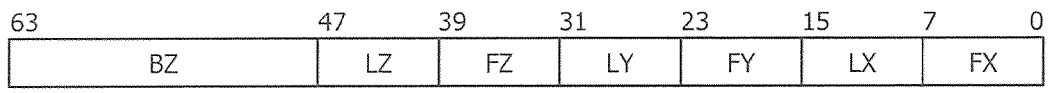
FIG. 9 shows an example of the Window Bounds Register format according to one embodiment of the present invention.

FIG. 9 shows an example of the Window Bounds Register format according to one embodiment of the present invention. In this exemplary embodiment, the following fields exist within each Window Bounds register:

First X (FX)—The First X field (bits 7:0) specifies the first X window value to be included in the operation being performed;

Last X (LX)—The Last X field (bits 15:8) specifies the last X window value to be included in the operation being performed;

First Y (FY)—The First Y field (bits 23:16) specifies the first Y window value to be included in the operation being performed;

Last Y (LY)—The Last Y field (bits 31:24) specifies the last Y window value to be included in the operation being performed;

First Z (FZ)—The First Z field (bits 39:32) specifies the first Z window value to be included in the operation being performed;

Last Z (LZ)—The Last Z field (bits 47:40) specifies the last Z window value to be included in the operation being performed; and Base Z (BZ)—The Base Z field (bits 63:48) specifies the base Z window value. The BZ field value is used to specify the general register element rotation base calculation, in one embodiment.

Move instructions are used to read and write the entire register. Separate move instructions allow the individual fields to be written.

Figure 10:
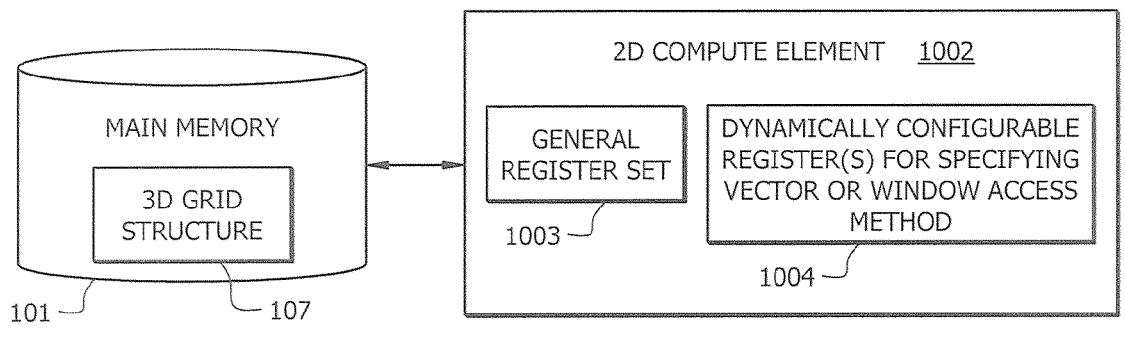
FIG. 10 shows a block diagram of an exemplary system in which a processing element is dynamically configurable as to the access method employed for accessing its general registers, according to one embodiment.

Turning to FIG. 10, a block diagram of an exemplary system according to one embodiment is shown. In the illustrated example, a processing element 1002, which may be processing element 102 or processing element 104 of FIG. 1 for instance, includes a general register set 1003, which may be implemented within a plurality of function pipes, such as described above with FIG. 2. Exemplary processing element 1002 further comprises dynamically configurable register(s) 1004 for configuring the access method to be used by processing element 1002 for accessing its general register set 1003. For instance, configurable register(s) 1004 may be set to configure the processing element for accessing its general register set 1003 via a vector access method or via a window access method as described above.

In one embodiment a processing element is provided that comprises a plurality of function pipe groups that each includes a plurality of function pipes, where each function pipe includes general register(s). The plurality of function pipe groups correspond to an X dimension of general register set for the processing element, and the plurality of function pipes correspond to a Y dimension of the general register set. For instance, in exemplary Implementation A eight function pipe groups are included in the processing element, where each function pipe group includes eight function pipes, thereby resulting in 8×8 general register arrangement.

In one embodiment, a plurality of general registers are included in each function pipe for storing a plurality of data points. For instance, in exemplary Implementation A 2,048 general registers that are each capable of storing a 32-bit data point are included in each function pipe.

In one embodiment, a neighborhood of data values that exceed one or more dimensions of the general register set is nevertheless stored to the general registers. Further, the positional relationships of the data values in the neighborhood are maintained in the general register set such that nearest neighbor types of operations may be performed on the data values by the processing element. For instance, a window access method as described above may be employed for storing the neighborhood of data values to the general registers.

The neighborhood of data values comprises an arrangement of data values that have positional relationships in 3 dimensions, i.e., X, Y, and Z dimensions. According to one embodiment of the window access method, the neighborhood of data values is partitioned into a plurality of window panes. In one embodiment, the number of window panes may be selected as a function of the size of the X and Y dimensions of the neighborhood and the size of the X and Y dimensions of the general register set. For instance, suppose that the neighborhood is 32×32×8, where the X and Y dimensions are each 32. In such case, in Implementation A (where the X and Y dimensions of the general register set are each 8), a 4×4 arrangement of window panes is implemented. For instance, the number data points in the X and Y dimensions of the neighborhood (i.e., 32×32) are divided by the X and Y dimensions of the general register set (i.e., 8×8), thereby resulting in the 4×4 arrangement of window panes.

In one embodiment, each window pane has an X and Y dimension corresponding to that of the general register set of the processing element. For instance, in Implementation A, each pane contains an 8×8 arrangement of data values, corresponding to the 8×8 general register set arrangement. Thus, each of the 4×4 window panes includes an 8×8 arrangement of data values (e.g., 32-bit data values).

Further, in one embodiment, the depth of each window pane corresponds to the depth (or Z dimension) of the neighborhood of data. As such, the total number of general registers included in each function pipe are grouped into blocks of general registers corresponding in size to the size of the depth (or Z dimension) of the neighborhood of data. For instance, continuing with the above example in which the 32×32×8 neighborhood is being stored to the general registers of Implementation A, the 2,048 general registers of each function pipe are grouped into 256 blocks of 8 general registers (corresponding to the depth of 8 of the neighborhood).

The neighborhood of data is stored to the general registers in accordance with the window pane mapping for processing of the data by the processing element, which may include nearest-neighbor types of computations.

Figure 11:
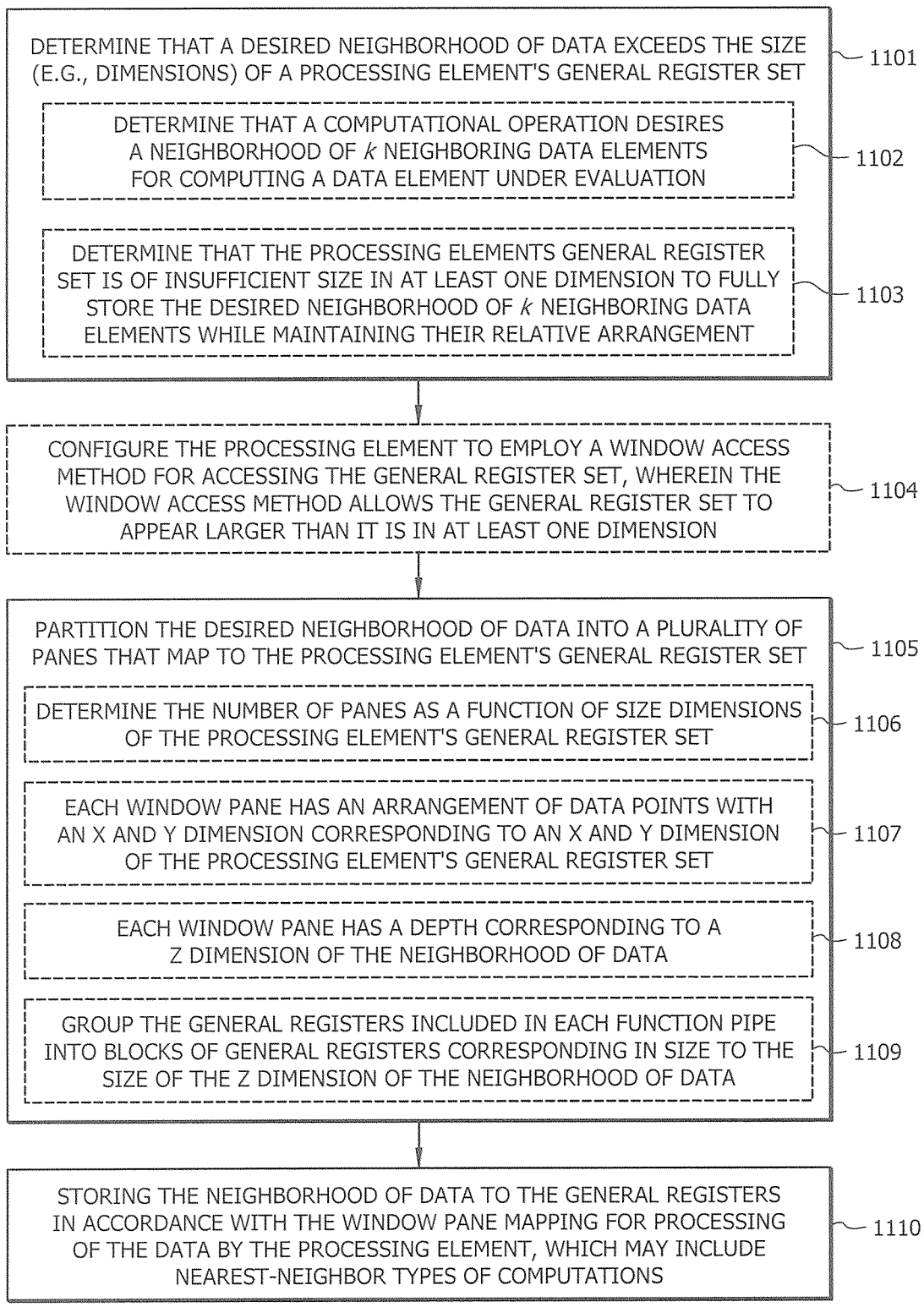
FIG. 11 shows an exemplary operational flow diagram according to one embodiment of the present invention.

Turning now to FIG. 11, an exemplary operational flow diagram according to one embodiment of the present invention is shown. In operational block 1101, it is determined that a desired neighborhood of data exceeds the size (e.g., dimensions) of a processing element's general register set (e.g., the general register set provided by the function pipes in the example of FIG. 2). In one embodiment, the determination of the optimal window size takes a fairly complex set of tradeoffs. One tradeoff is that a window size that is as large as possible may be desired (e.g., to minimize unnecessary memory bandwidth usage), but the bigger the window, the more general registers are used. There will usually be general register usage pressure. The algorithm could do more with more general registers without having to use memory bandwidth to load/store the general registers to/from memory.

The tradeoffs are complex enough that algorithms that use the windowing mechanism may be coded using machine level instructions to specify the window size to configure for such algorithm. For the Reverse Time Migration algorithms, as an example, there is usually a couple of pages of code that take 99% of the compute cycles. Having a programmer hand code/optimize the machine level instructions (as opposed to a compiler automatically performing this optimization) is not uncommon. The programmer may spend days, weeks or even months hand tuning these codes and then use 10's of thousands of computer systems to perform the computation when it is in production. Of course, if a compiler is capable of automatically optimizing the window access configuration (e.g., window size, etc.) for a given application, such an implementation may likewise be employed within the scope of the present invention.

In certain embodiments, the determination in block 1101 includes performance of sub-blocks 1102 and 1103. In sub-block 1102, it is determined that a computational operation to be performed by the processing element desires a neighborhood of neighboring data elements for computing a data element under evaluation. For instance, in the above-mentioned example, a desired neighborhood of data (e.g., data window 301 of FIG. 3) may be a 32×32×8 arrangement of data points (e.g., 32-bit data points). In sub-block 1103, it is determined that the processing element's general register set is of insufficient size in at least one dimension to fully store the desired neighborhood of k neighboring data elements while maintaining their relative arrangement. For instance, continuing with the above-mentioned example, the processing element's general register set (in Implementation A) is 8×8×2,048 in size. Accordingly, in this example, the X and Y dimensions 8) of the general register set is insufficient for storing the X and Y dimensions i.e., 32) of the desired neighborhood of data.

In certain embodiments, as mentioned above, responsive to the determination in block 1101, the processing element is dynamically configured (in operational block 1104) to employ a window access method for accessing its general register set, wherein the window access method allows the general register set to appear larger than it is in one or more dimensions.

In operational block 1105, the desired neighborhood of data is partitioned into a plurality of panes that map to the processing element's general registers. In certain embodiments, operational block 1105 includes performance of sub-operational blocks 1106-1109. In sub-block 1106, the number of panes are determined as a function of size dimensions of theprocessing element's general register set. For instance, in one embodiment, the number of window panes may be selected as a function of the size of the X and Y dimensions of the neighborhood and the size of the X and Y dimensions of the general register set. Continuing, for example, with the above-mentioned example in which the neighborhood of data is 32×32×8 (such that X and Y dimensions are each 32), in Implementation A (where the X and Y dimensions of the general register set are each 8), a 4×4 arrangement of window panes is implemented because the number data points in the X and Y dimensions of the neighborhood (i.e., 32×32) are divided by the X and Y dimensions of the general register set (i.e., 8×8), thereby resulting in the 4 u4 arrangement of window panes.

As shown in sub-block 1107, each window pane has an arrangement of data points with an X and Y dimension corresponding to an X and Y dimension of the processing element's general register set, in one embodiment. For instance, in Implementation A, each pane contains an 8×8 arrangement of data values, corresponding to the 8×8 general register set arrangement. Thus, each of the 4×4 window panes includes an 8×8 arrangement of data values (e.g., 32-bit data values) in the above-mentioned example.

As shown in sub-block 1108, each window pane has a depth corresponding to a Z dimension of the neighborhood of data, in one embodiment. As such, as part of the mapping, the total number of general registers included in each function pipe are grouped into blocks of general registers corresponding in size to the size of the depth (or Z dimension) of the neighborhood of data in sub-block 1109. For instance, continuing with the above-mentioned example in which the 32×32×8 neighborhood is being stored to the general registers of Implementation A, the 2,048 general registers of each function pipe are grouped into 256 blocks of 8 general registers (corresponding to the depth of 8 of the neighborhood).

In operational block 1110, the neighborhood of data is stored to the general registers in accordance with the window pane mapping for processing of the data by the processing element, which may include nearest-neighbor types of computations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   determining that a desired neighborhood of data exceeds a size of at least one dimension of a processing element's general register set;
   partitioning the desired neighborhood of data into a plurality of panes that map to the processing element's general register set; and
   storing the neighborhood of data to the general register set in accordance with pane mapping for processing of the data by the processing element.

2. The method of claim 1 wherein said desired neighborhood of data comprises three-dimensional data.

3. The method of claim 1 wherein said determining comprises:
   determining that a computational operation to be performed by the processing element desires a neighborhood of k neighboring data elements for computing a data element under evaluation.

4. The method of claim 3 wherein said determining that said desired neighborhood of data exceeds said size of at least one dimension of the processing element's general register set comprises:
   determining that the general register set is of insufficient size in at least one dimension to fully store the desired neighborhood of k neighboring data elements while maintaining a relative positional arrangement of said k neighboring data elements.

5. The method of claim 1 further comprising:
   responsive to determining that the desired neighborhood of data exceeds the size of at least one dimension of the processing element's general register set, dynamically configuring the processing element to employ a window access method for accessing its general register set.

6. The method of claim 5 wherein the window access method makes the general register set to appear larger than it is in one or more dimensions.

7. The method of claim 1 further comprising:
   determining a number of panes into which the desired neighborhood of data is partitioned as a function of size dimensions of the processing element's general register set.

8. The method of claim 7 wherein the number of panes is determined as a function of size of X and Y dimensions of the neighborhood of data and size of X and Y dimensions of the general register set.

9. The method of claim 8 wherein the size of the X and Y dimensions of the neighborhood of data is divided by the size of X and Y dimensions of the general register set to determine the number of panes.

10. The method of claim 7 wherein each of said plurality of panes has an arrangement of data elements, said arrangement comprising an X and Y dimension corresponding to an X and Y dimension of the processing element's general register set.

11. The method of claim 10 wherein each pane has a depth corresponding to a Z dimension of the desired neighborhood of data.

12. The method of claim 1 further comprising:
    processing of the desired neighborhood of data by the processing element.

13. The method of claim 12 wherein said processing comprises:
    performing at least one nearest-neighbor type of computation.

14. The method of claim 1 wherein said processing element comprises a plurality of function pipe groups each containing a plurality of function pipes, where each function pipe includes a plurality of general registers, whereby the general registers of the function pipes provide said general register set.

15. The method of claim 14 wherein a number of said function pipe groups provides a X dimension of the general register set, a number of said function pipes provides a Y dimension of the general register set, and a number of said general registers in each function pipe provides a Z dimension of the general register set; and
    wherein said partitioning comprises determining a number of panes into which the desired neighborhood of data is partitioned as a function of size of X and Y dimensions of the desired neighborhood of data and size of the X and Y dimensions of the general register set.

16. The method of claim 15 wherein the desired neighborhood of data comprises three-dimensional data, wherein each pane comprises a plurality of data elements from the desired neighborhood of data arranged therein in three dimensions, and wherein X and Y dimensions of each pane correspond to the X and Y dimensions of the general register set.

17. The method of claim 16 wherein a Z dimension of each pane corresponds to a Z dimension of the desired neighborhood of data.

18. A method comprising:
partitioning a neighborhood of three-dimensional data that exceeds a size of at least one dimension of a processing element's general register set into a plurality of panes that map to the processing element's general register set to make the processing element's general register set appear larger in said at least one dimension; and
storing the neighborhood of data to the general register set in accordance with the pane mapping for processing of the neighborhood of three-dimensional data by the processing element.

19. The method of claim 18 further comprising:
processing the neighborhood of three-dimensional data by the processing element.

20. The method of claim 19 wherein said processing comprises:
performing at least one nearest-neighbor type of computation.

21. The method of claim 18 wherein said processing element comprises a plurality of function pipe groups each containing a plurality of function pipes, where each function pipe includes a plurality of general registers, whereby the general registers of the function pipes provide said general register set.

22. The method of claim 21 wherein a number of said function pipe groups provides a X dimension of the general register set, a number of said function pipes provides a Y dimension of the general register set, and a number of said general registers in each function pipe provides a Z dimension of the general register set; and
wherein said partitioning comprises determining a number of panes into which the neighborhood of three-dimensional data is partitioned as a function of size of X and Y dimensions of the neighborhood of three-dimensional data and size of the X and Y dimensions of the general register set.

23. The method of claim 22 wherein each pane comprises a plurality of data elements from the neighborhood of three-dimensional data arranged therein in three dimensions, and wherein X and Y dimensions of each pane correspond to the X and Y dimensions of the general register set.

24. The method of claim 23 wherein a Z dimension of each pane corresponds to a Z dimension of the neighborhood of three-dimensional data.

25. A system comprising:
at least one processing element comprising a plurality of function pipe groups each containing a plurality of function pipes, where each function pipe includes a plurality of general registers, whereby the general registers of the function pipes provide a general register set, and whereby a number of said function pipe groups provides a X dimension of the general register set, a number of said function pipes provides a Y dimension of the general register set, and a number of said general registers in each function pipe provides a Z dimension of the general register set;
wherein said at least one processing element is operable to use a window access method for mapping to the general register set a neighborhood of three-dimensional data that exceeds a size of at least one dimension of the general register set.

26. The system of claim 25 wherein said window access method comprises partitioning the neighborhood of three-dimensional data into a plurality of panes.

27. The system of claim 26 wherein a number of said panes is selected as a function of size of X and Y dimensions of the neighborhood of three-dimensional_data and the size of the X and Y dimensions of the general register set.

28. The system of claim 27 wherein said number of said panes is selected by dividing the size of the X and Y dimensions of the neighborhood of three-dimensional data by the X and Y dimensions of the general register set.

29. The system of claim 26 wherein each pane comprises a plurality of data values from the neighborhood of three-dimensional data arranged therein in three dimensions.

30. The system of claim 29 wherein X and Y dimensions of each pane correspond to the X and Y dimensions of the general register set.

31. The system of claim 30 wherein a Z dimension of each pane corresponds to a Z dimension of the neighborhood of three-dimensional data.

32. The system of claim 31 wherein the general registers of each function pipe are grouped into blocks of general registers corresponding in size to size of the Z dimension of the neighborhood of three-dimensional data.

33. A system comprising:
at least one processing element comprising function logic for processing data and a general register set for storing said data during said processing;
wherein said at least one processing element is dynamically configurable to employ any of a plurality of different access methods for accessing its general register set, wherein said plurality of different access methods comprise a window access method comprising partitioning a neighborhood of three-dimensional data that exceeds a size of at least one dimension of the general register set into a plurality of panes that map to the general register set so as to make the general register set appear larger in said at least one dimension.

34. The system of claim 33 wherein said plurality of different access methods further comprise a vector access method.

* * * * *